United States Patent [19]
Miyashita et al.

[11] Patent Number: 5,988,791
[45] Date of Patent: Nov. 23, 1999

[54] INK-JET PRINTING APPARATUS, INK-JET PRINTING METHOD AND PRINTED PRODUCT

[75] Inventors: Yoshiko Miyashita, Kawasaki; Toshiyuki Yanaka, Tokyo; Yasushi Miura, Kawasaki; Kazuyoshi Takahashi, Kashiwazaki, all of Japan

[73] Assignee: Canon Kabushiki Kaisha, Tokyo, Japan

[21] Appl. No.: 08/503,634

[22] Filed: Jul. 18, 1995

[30] Foreign Application Priority Data

| Jul. 21, 1994 | [JP] | Japan | 6-169792 |
| Jun. 5, 1995 | [JP] | Japan | 7-138343 |

[51] Int. Cl.⁶ .............. B41J 2/21; B41J 2/015; B41J 11/00
[52] U.S. Cl. .............. 347/43; 347/21; 347/100
[58] Field of Search .............. 347/43, 100, 102, 347/21, 23; 358/518, 502, 523

[56] References Cited

U.S. PATENT DOCUMENTS

| 4,314,124 | 2/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,672,432 | 6/1987 | Sakurada et al. . | |
| 4,723,129 | 2/1988 | Endo et al. . | |
| 4,740,796 | 4/1988 | Endo et al. . | |
| 4,959,659 | 9/1990 | Sasaki et al. | 347/43 |
| 5,343,311 | 8/1994 | Morag et al. | 358/518 |
| 5,517,334 | 5/1996 | Morag et al. | 358/518 |
| 5,563,724 | 10/1996 | Boll et al. | 358/502 |

FOREIGN PATENT DOCUMENTS

| 0532302 | 3/1993 | European Pat. Off. . | |
| 558236 | 9/1993 | European Pat. Off. | B41J 2/17 |
| 0600735 | 6/1994 | European Pat. Off. . | |
| 59-123670 | 7/1984 | Japan . | |
| 59-138461 | 8/1984 | Japan . | |
| 62-053492 | 3/1987 | Japan . | |
| 3046589 | 7/1991 | Japan . | |
| 4018358 | 1/1992 | Japan . | |
| 6-305131 | 11/1994 | Japan . | |

*Primary Examiner*—N. Le
*Assistant Examiner*—Thinh Nguyen
*Attorney, Agent, or Firm*—Fitzpatrick, Cella, Harper & Scinto

[57] ABSTRACT

An ink-jet printing apparatus printing apparatus prints an image with a plurality of similar color inks having different concentrations and a special ink having a single concentration. In the apparatus, graininess resulting from ink dots is decreased for all hues of the printed image. A decision is made as to whether or not a hue of an image to be printed can be printed with inks without the special ink of a color (for example, special color BL (blue)) having a single concentration. When it is decided that the hue of the image is to be printed with inks without the special color ink, data on ink color BL (blue) is decomposed into data on C (cyan) and data on M (magenta). The hue can be printed without the color BL, thereby significantly decreasing graininess in a portion having this hue.

51 Claims, 21 Drawing Sheets

FIG. 16
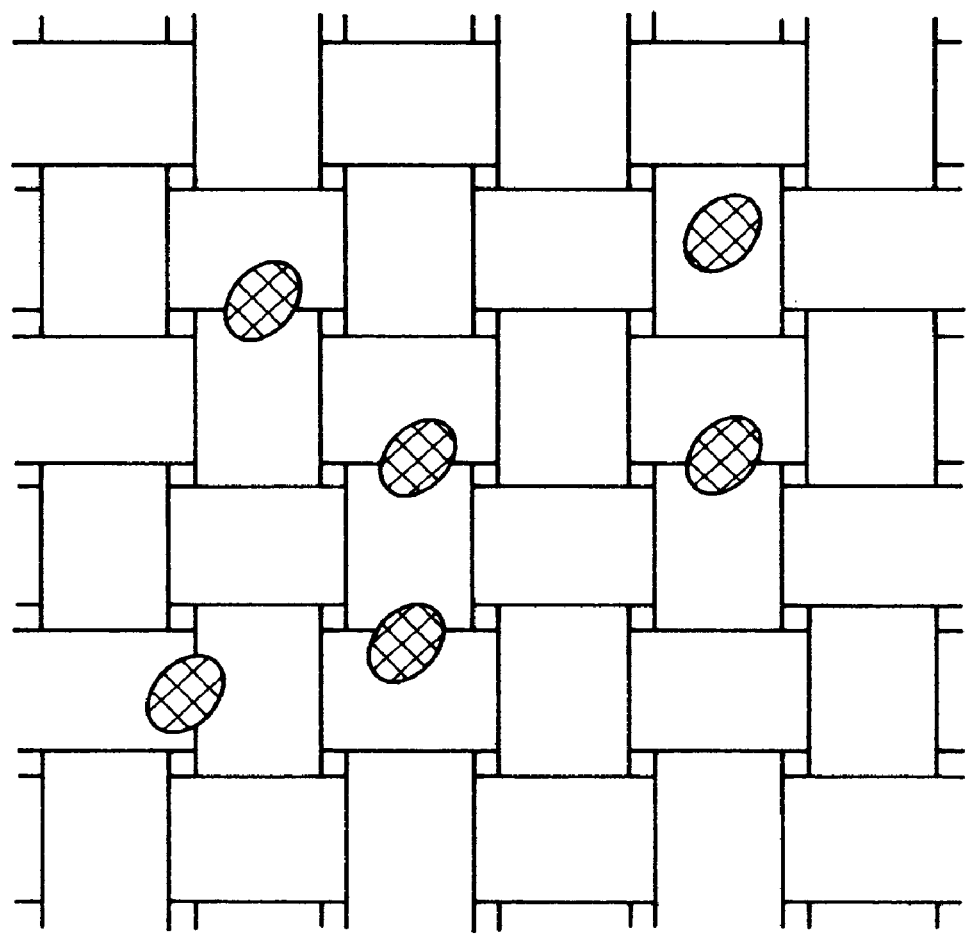
 : BL

FIG. 19
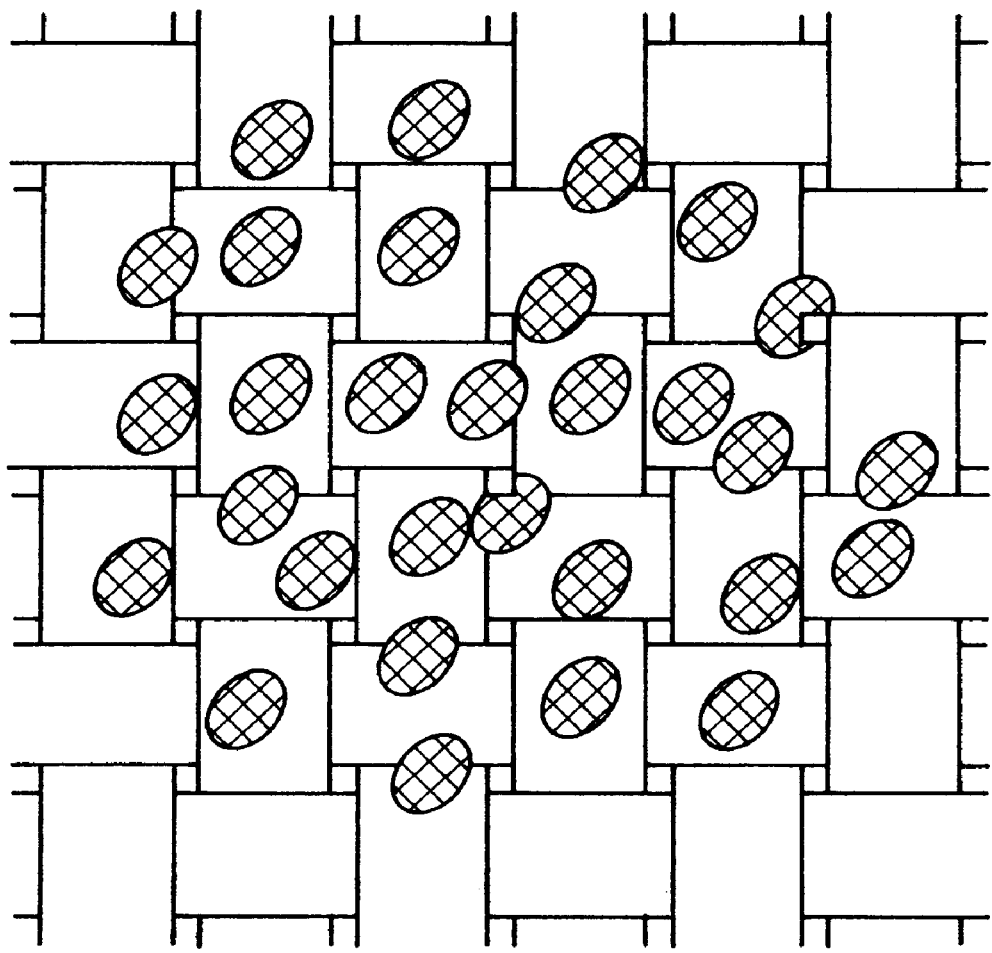
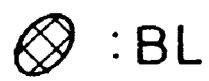 : BL

⊗ : BL
⊘ : LIGHT C
⊙ : DARK M
○ : LIGHT M

INK-JET PRINTING APPARATUS, INK-JET PRINTING METHOD AND PRINTED PRODUCT

BACKGROUND OF THE INVENTION

1. Field of the Invention

The present invention relates to an ink-jet printing method and an ink-jet printing apparatus, and particularly to an ink-jet printing method and apparatus in which an image is formed by discharging an ink from an ink-jet head and adhering a plurality of ink dots to a printing material.

2. Description of the Related Art

A printing apparatus (ink-jet printing apparatus) which employs an ink-jet process has recently been brought into practical use as a printing mechanism in a printer, a copying machine, a facsimile apparatus or the like, or an information output apparatus in a composite electronic apparatus or a work station comprising a computer, a word processor, etc. In such an ink-jet printing apparatus, printing is performed by discharging an ink from an ink-jet head to a printing material. The ink-jet printing apparatus has the various advantages that the head can readily be made compact, a high-definition image can be printed at a high speed, the running cost is low, noise is less due to the non-impact process, and a color image can easily be printed by using multi-color inks.

Particularly, in an ink-jet head which utilizes thermal energy for discharging, an electro-thermal converter element, electrodes, liquid paths, etc. can be formed on a substrate through a semiconductor manufacturing process comprising etching, evaporation and sputtering. Thus, an ink-jet head having high-definition and high-density arrangement of liquid paths (arrangement of discharge openings) can easily be formed, and a head can further be made compact.

In a printing apparatus employing a serial scanning process in which an ink-jet head is horizontally scanned in a direction perpendicular to the direction of feeding (referred to as "vertical scanning direction" hereinafter) of a printing material, during this horizontal scanning, an image is printed by discharging an ink from a plurality of discharge openings of the ink-jet head to the printing material in accordance with image data. After printing is completed for one line by the horizontal scanning, the printing material is moved for a predetermined length in the direction of vertical scanning, and an image of a next line is then printed on the printing material in the same manner as described above. These operations are repeated to print an image over the entire printing material. The use of such an ink-jet head having a plurality of discharge openings, which can be arranged in the feeding direction of the printing material, enables the discharge openings to be arranged with a length corresponding to the printing amount for one line, i.e., the amount of feeding of the printing material. The printing speed can thus be further increased by increasing the number of the discharge openings arranged.

In the above-described ink-jet printing apparatus, when gradation printing is performed, e.g., when an image is printed, the image density can generally be determined by the density of the dots which are formed on the printing material by discharging an ink. However, when gradation printing is performed by such a process, the respective dots in a low-density portion are relatively highly visible because the dot density in the low-density portion is decreased. This consequently causes the conventional known problem that an image in the low-density portion exhibits a feeling of graininess.

On the other hand, when single-color printing is performed, it is known to be most general to decrease the feeling of graininess by using a plurality of inks having different dye concentrations and using a low-concentration ink in a low-density portion.

However, the preparation of a plurality of inks of similar colors having different concentrations for all color inks creates an increase in size of an apparatus, etc. Particularly, when an ink-jet printing process is used for a textile printing system for printing on a cloth, since this system frequently uses inks of colors other than general ink colors, i.e., special color inks, for widening the range of color reproduction, the preparation of a plurality of inks having different concentrations for these special color inks causes further increases in the number of the heads, the size of the apparatus and the cost.

Since it is necessary to use deep colors for printing on a cloth used in the textile printing system, as compared with printing on paper used in a general printing apparatus, the dye concentration of an ink used for printing on a cloth is generally increased for obtaining a sufficient density. There is thus the tendency that the number of the dots formed for reproducing a low-density portion is decreased as compared with other systems. When a low-density portion is printed by the textile printing system, therefore, a feeling of graininess is easily exhibited.

SUMMARY OF THE INVENTION

The present invention has been achieved for solving the above-described problem of the feeling of graininess. An object of the present invention is to provide an ink-jet printing apparatus which uses a plurality of inks of similar colors having different concentrations and an ink having a single concentration, and particularly provide an ink-jet printing method and apparatus which are capable of printing an image having decreased feelings of graininess for all colors without causing an increase in size of the apparatus even when inks having high concentrations are used for printing an image as a whole, as in printing on a cloth.

In order to achieve the object, the present invention provides an ink-jet printing apparatus in which a plurality of basic color inks at least one of which has a plurality of inks having different concentrations, and an ink of a color other than the basic colors, which is indicated as a color between two basic colors of the plurality of basic colors in a color space and which has a single concentration are discharged from ink-jet heads to a printing material based on data about an image to be printed. The printing apparatus comprises decision means for deciding whether or not the color indicated by the image data is a color other than the basic colors and a color in a predetermined portion within a range which can be expressed in the two basic colors; and substitution means for substituting at least a part of image data about the color other than the basic colors in the image data by data about at least one of the two basic colors when the decision means decides that the color indicated by the image data is a color in the predetermined portion.

The present invention further provides an ink-jet printing method comprising printing by discharging, from ink-jet heads to a printing material, basic color inks at least one of which has a plurality of different concentrations, and an ink of a color other than the basic colors which has a single concentration and which is a color between the basic colors and another basic color. In the printing method, a portion of an image to be printed which can be expressed in a color other than the basic colors is printed with at least one of the basic color inks which has a lower concentration.

The above-described construction permits a low-density portion to be reproduced with an ink having a single concentration to be reproduced with low-concentration inks of inks which can form the color of the ink having a single concentration by color mixture.

BRIEF DESCRIPTION OF THE DRAWINGS

FIG. 16 is a schematic drawing showing the result of printing by a conventional system;

FIG. 19 is a schematic drawing showing the result of printing when a BL signal is not decomposed in each of the embodiments of the present invention;

FIG. 21 is a drawing illustrating decomposition of a BL signal in accordance with the second embodiment of the present invention.

DETAILED DESCRIPTION OF THE PREFERRED EMBODIMENTS

Figure 1:
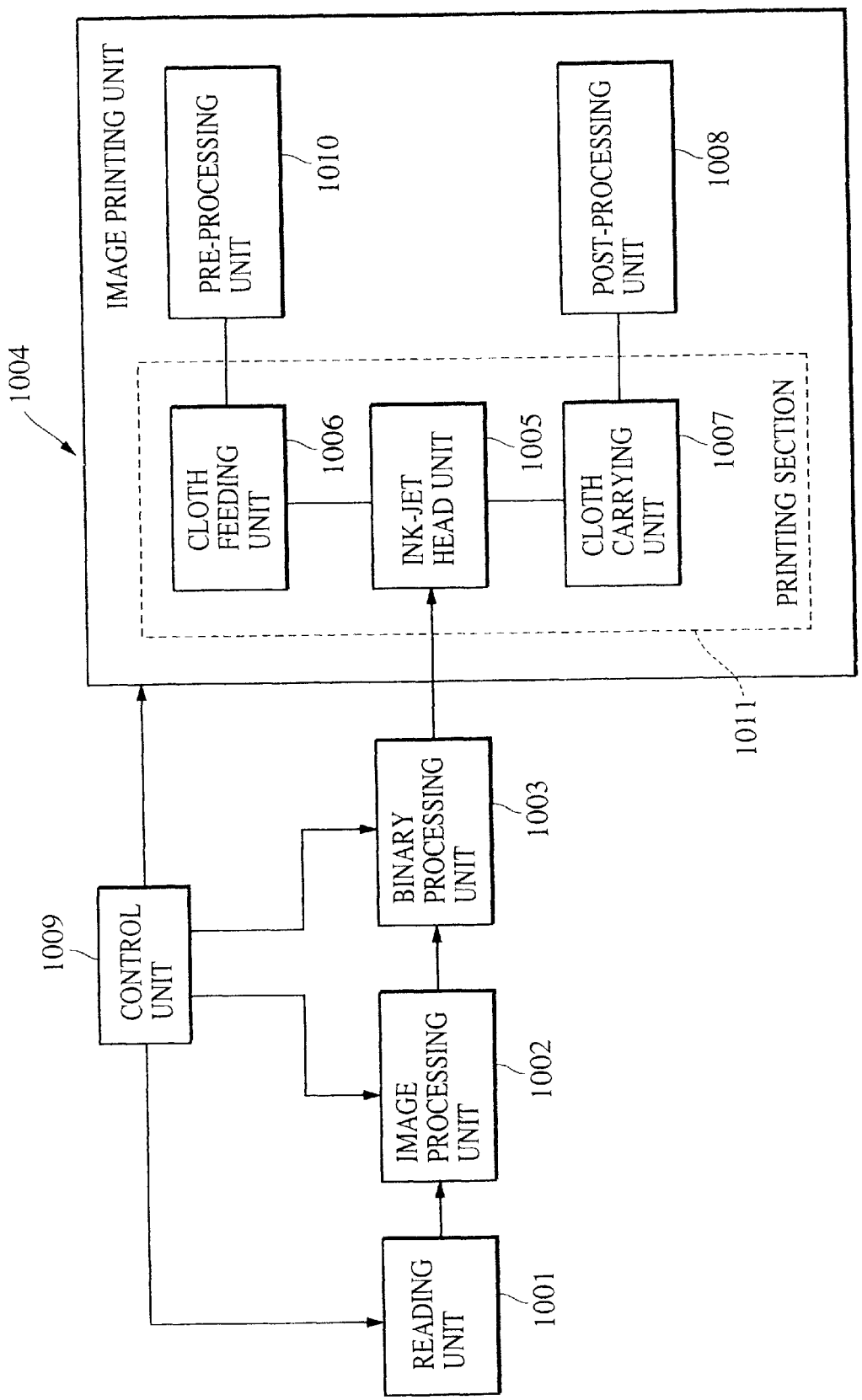
FIG. 1 is a block diagram showing the entire configuration of a textile printing system in accordance with a first embodiment of the present invention.

The present invention is described in detail below with reference to the embodiments shown in the drawings, which use an ink-jet textile printing system.

In the description below, "color" is defined as a visual characteristic which can be distinguished or represented by the three attributes (hue, lightness and chroma) of colors. The hue is a color attribute which characterizes visual properties of colors, e.g., cyan, magenta, yellow, red, blue and green, and is determined by a circumferential position around an axis determined by achromatic colors in a color space. The lightness represents a color attribute related to bright and darkness, and the chroma represents a visual attribute which indicates color density or a scale thereof.

(First Embodiment)

Before the construction characteristic of the present invention is described, the general construction of a textile printing system to which the present invention can be applied is described with reference to FIGS. 1 to 7.

(1) Entire construction of system

FIG. 1 is a block diagram illustrating the entire construction of a textile printing system in accordance with an embodiment of the present invention.

The textile printing system of this embodiment comprises a reading unit 1001 for reading an original image formed by a designer or the like, an image processing unit 1002 for processing the original image data read by the reading unit 1001, a binary processing unit 1003 for making binary the image data formed by the image processing unit 1002, and an image printing unit 1004 for printing an image on a cloth based on the binary image data.

The reading unit 1001 reads the original image by a CCD image sensor and outputs the read data as an electrical signal to the image processing unit 1002. The image processing unit 1002 forms discharge data for driving an ink-jet head unit 1005 for discharging four-color inks, i.e., magenta, cyan, yellow and black inks, which will be described below, based on the original image data output from the reading unit 1001. In the formation of the discharge data, the original image is processed for reproducing the image by ink dots, a color arrangement is determined for obtaining a color tone, a layout is changed, and enlargement or reduction in size of a pattern is selected.

The image printing unit 1004 comprises a pre-treatment unit 1010 for pre-treating a cloth on which printing is performed, a post-treatment unit 1008 for post-treating the cloth subjected to printing and containing the cloth therein, and a printing unit 1011 for printing on the cloth. The printing unit 1011 comprises the ink-jet head unit 1005 for discharging an ink in accordance with recording data, a cloth feeding unit 1006 for feeding the cloth to the ink-jet head unit 1005, and a cloth carrying unit 1007 provided opposite to the ink-jet head unit 1005 for precisely carrying the cloth. The construction of the image printing unit 1004 will be described in detail below with reference to the drawings.

(2) Printing mechanism

The operation of a serial type ink-jet printer serving as the image printing unit 1004 of this embodiment is described with reference to FIG. 2.

Figure 2:
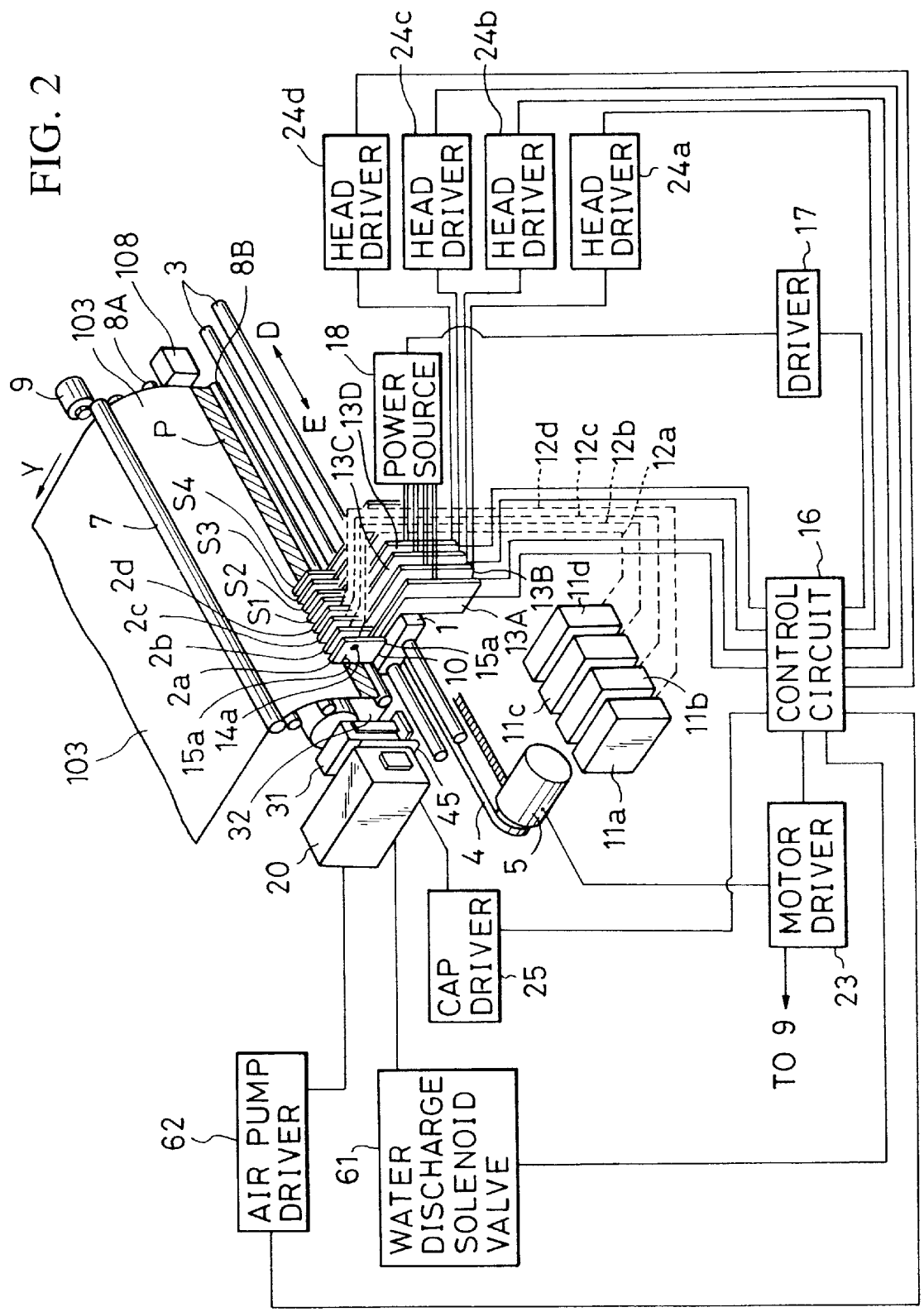
FIG. 2 is a perspective view schematically showing the mechanical construction of an ink-jet printing unit which is applied to the first embodiment shown in FIG. 1.

In FIG. 2, on a carriage 1 are loaded color ink-jet heads (referred to as printing heads or simply as heads) 2a, 2b, 2c and 2d corresponding to four colors, i.e., cyan (C), magenta (M), yellow (Y), and black (BK) colors, and special color heads S1 to S4, guide shafts 3 movably supporting the carriage 1. These heads may be detachable from the carriage 1 independently or in a unit of several heads.

An endless belt 4 partly contacts the carriage 1 and is stretched around the pulley provided on a driving shaft of a carriage driving motor 5, which is driven by a motor driver 23 serving as a pulse motor, and a pulley (not shown) provided at the other end of the printer. The belt 4 stretched around both pulleys is thus moved by driving the carriage driving motor 5, and consequently the carriage 1 can be moved along the guide shafts 3 so as to scan printing surface P of a printing material, i.e., a printing medium 103. The printing medium 103 such as printing paper or cloth is fed by the feeding force applied from feeding rollers 7 driven by a feeding motor 9, and is guided by guide rollers 8A and 8B.

Each of the printing heads 2a, 2b, 2c and 2d, and special color printing heads has 256 discharge openings for discharging ink droplets to the printing medium 103, for example, with a density of 400 DPI (dots/inch). Inks are supplied to the printing heads 2a, 2b, 2c and 2d and the special color heads from ink tanks 11a, 11B, 11c and 11d and special color ink tanks through supply tubes 12a, 12b, 12c and 12d and special color supply tubes, respectively. An ink discharge signal is selectively supplied to energy generation means (not shown) provided in liquid flow paths respectively communicating with the discharge openings through head drivers 24a, 24b, 24c and 24d and special color head drivers.

On the printing heads 2a, 2b, 2c, 2d, etc. are provided head heaters 14a, 14b, 14c and 14d (the head heaters 14b, 14c and 14d are not shown in the drawing) and temperature detection means 15a, 15b, 15c and 15d (the temperature detection means 15b, 15c and 15d are not shown in the drawing), respectively. The detection signals from the temperature detection means 15a, 15b, 15c, 15d, etc. are input to a control circuit 16 having a CPU. The control circuit 16 controls heating by the head heaters 14a, 14b, 14d, 14d, etc. through a driver 17 and a power supply 18 on the basis of the detection signals.

A capping unit 20 contacts the discharge opening surface of each of the printing heads 2a, 2b, 2c, and 2d during non-recording so as to prevent drying and contamination with foreign materials, or remove the foreign materials. Specifically, during non-printing, the printing heads 2a, 2b, 2c and 2d are moved to positions opposite to the capping unit 20. The capping unit 20 is driven forward by a capping driver 25 so as to cap the discharge opening surfaces by an elastic member 44 in contact therewith. Although capping means for the special color heads is not shown in FIG. 2, when the special color heads are provided, the capping means is of course provided for the special color heads.

A clogging preventing unit 31 is adapted for receiving the discharged ink when inks are discharged from the printing heads 2a, 2b, 2c and 2d without printing. The clogging preventing unit 31 can be moved to a position opposite to each of the printing heads 2a, 2b, 2c and 2d, and comprises a liquid receiving member 32 for absorbing the ink discharged. The clogging preventing unit 31 is disposed between the position of the capping unit 20 and the printing start position in the direction of scanning of the heads. It is effective that each of the liquid receiving member 32 and a liquid holding member 45 comprises a spongy porous member or a sintered plastic material.

To the capping unit 20 are connected a water discharge solenoid valve 61 and an air pump driver 62 for discharging washing water and air, respectively, from nozzles provided in the capping unit 20 under control by the control circuit 16.

The above-described ink-jet printer is a general device for producing printed products in a factory. Namely, the printer is not an apparatus widely used in offices, but the present invention can be applied to any apparatus including the printer, the apparatus used in offices, etc.

Figure 3:
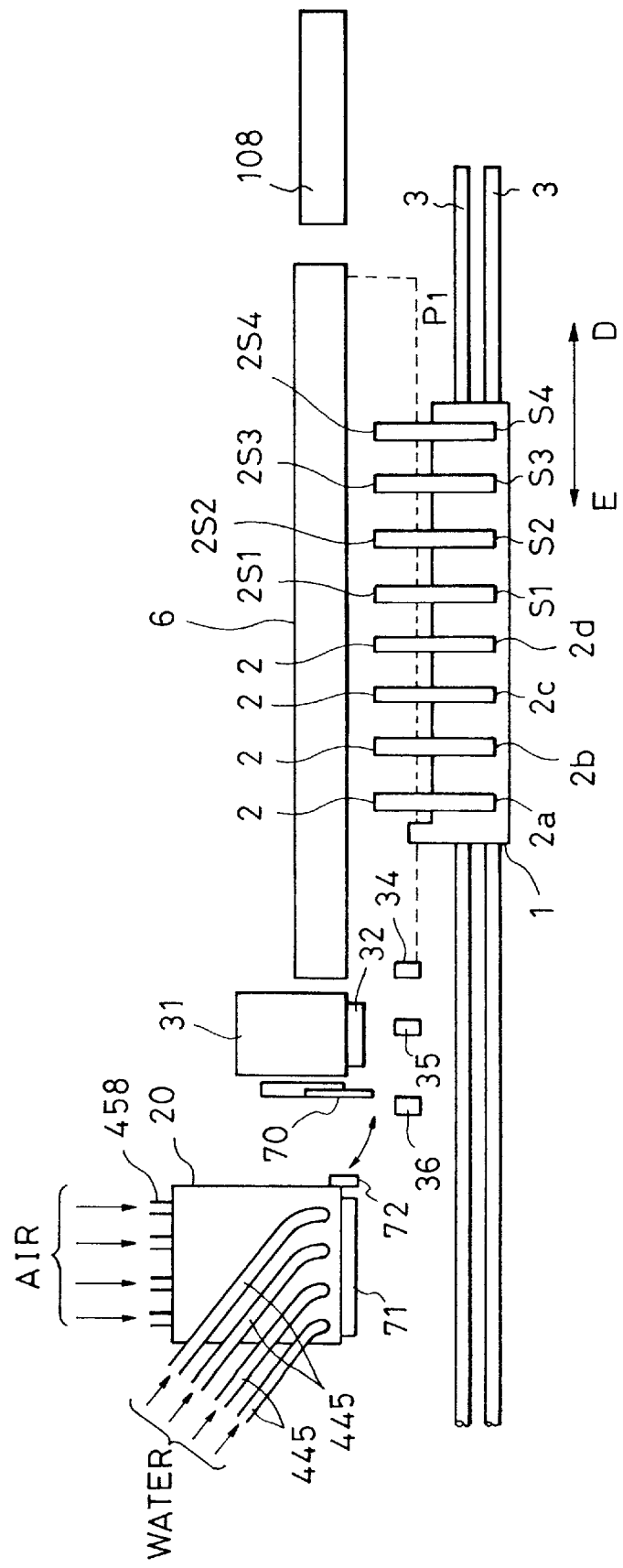
FIG. 3 is a plan view of the same ink-jet printing unit.

FIG. 3 is a plan view for explaining the operation of the printing heads of this embodiment. The same members as those shown in FIG. 2 are denoted by the same reference numerals, and are not described below. A construction related to the special color heads 2S1 to 24 is also not shown in FIG. 3.

In FIG. 3, a printing operation start detecting sensor 34 and a capping position detecting sensor 36 are provided for detecting the position of each of the printing heads 2a, 2b, 2c and 2d. A pre-discharge position detecting sensor 35 is provided for detecting a reference position for a discharge operation without printing in which the printing heads 2a, 2b, 2c and 2d are moved in the scanning direction.

A head characteristic measuring unit 108 can be used for head shading and comprises a feeding mechanism for feeding a printing medium on which a head shading test pattern is printed by each of the printing heads, and a reading mechanism for reading information of the test patterns. As the head characteristic measuring unit, a unit as disclosed in Japanese Patent Laid-Open No. 4-18358 (FIG. 31 in this specification), which was filed by the applicant of this invention, can be used.

The ink-jet printing operation will now be described below.

In the stand-by state, the printing heads 2a, 2b, 2c and 2d are capped by the capping unit 20. When a command to start a printing operation is output, the motor 5 is driven by the motor driver 23 to start the movement of the carriage 1. During this movement, at the time each of the printing heads is detected by the pre-discharge position detecting sensor 35, pre-discharge from each of the printing heads to the clogging preventing unit 31 is performed for a predetermined time on the basis of the detection. The carriage 1 is then moved in the direction of arrow D again. When each of the printing heads is detected by the printing operation start detecting sensor 34, the printing heads 2a, 2b, 2c and 2d are driven to selectively discharge inks from the discharge openings thereof on the basis of the detection signals in accordance with image data. As a result, ink droplets are discharged to form dots in portion P with a printing width on the printing medium 103, thereby forming an image in a matrix pattern. When printing is carried out with a predetermined width, i.e., a width determined by the interval and number of the discharge openings of each printing heads in the direction of vertical scanning, the carriage 1 is moved to the position at the right end of the printer shown in FIG. 3 (this position can be detected by counting the pulses applied to the motor 5). After the position is detected, pulses for the width of arrangement of the printing heads are applied for moving the carriage 1 so that the printing head 2a at the rear end thereof transverses the printing medium 103. The direction of scanning is then reversed, and the carriage 1 is moved in the direction of arrow E to return to the predischarge position. At the same time, the printing medium 103 is fed for at least a length corresponding to the width of the printing width portion P in the direction of arrow F. The above-described operation is repeated again.

(3) Construction of apparatus

Figure 4:
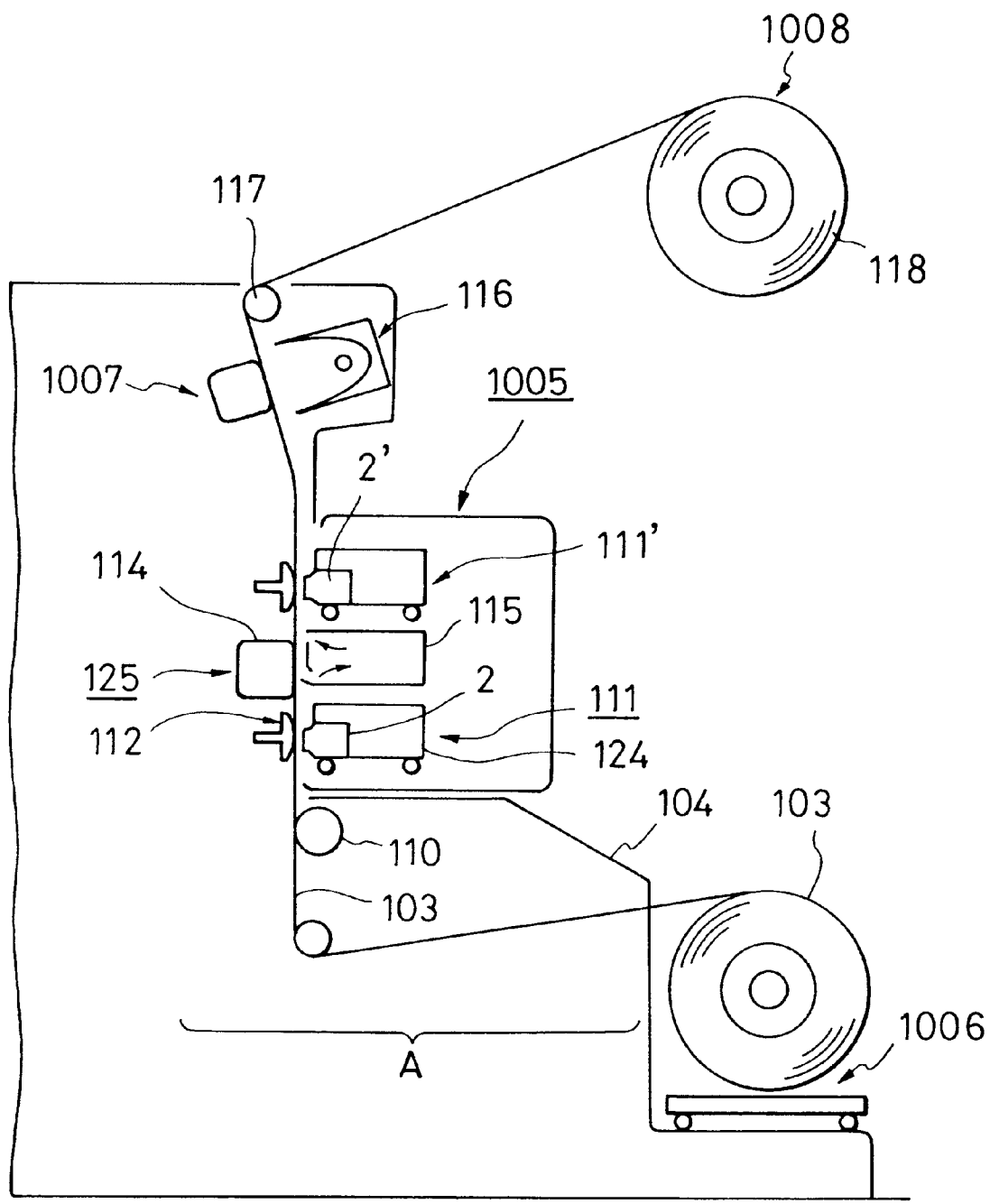
FIG. 4 is a side sectional view schematically showing the mechanical construction of the ink-jet printing unit and the cloth feeding unit in the first embodiment shown in FIG. 1.
Figure 5:
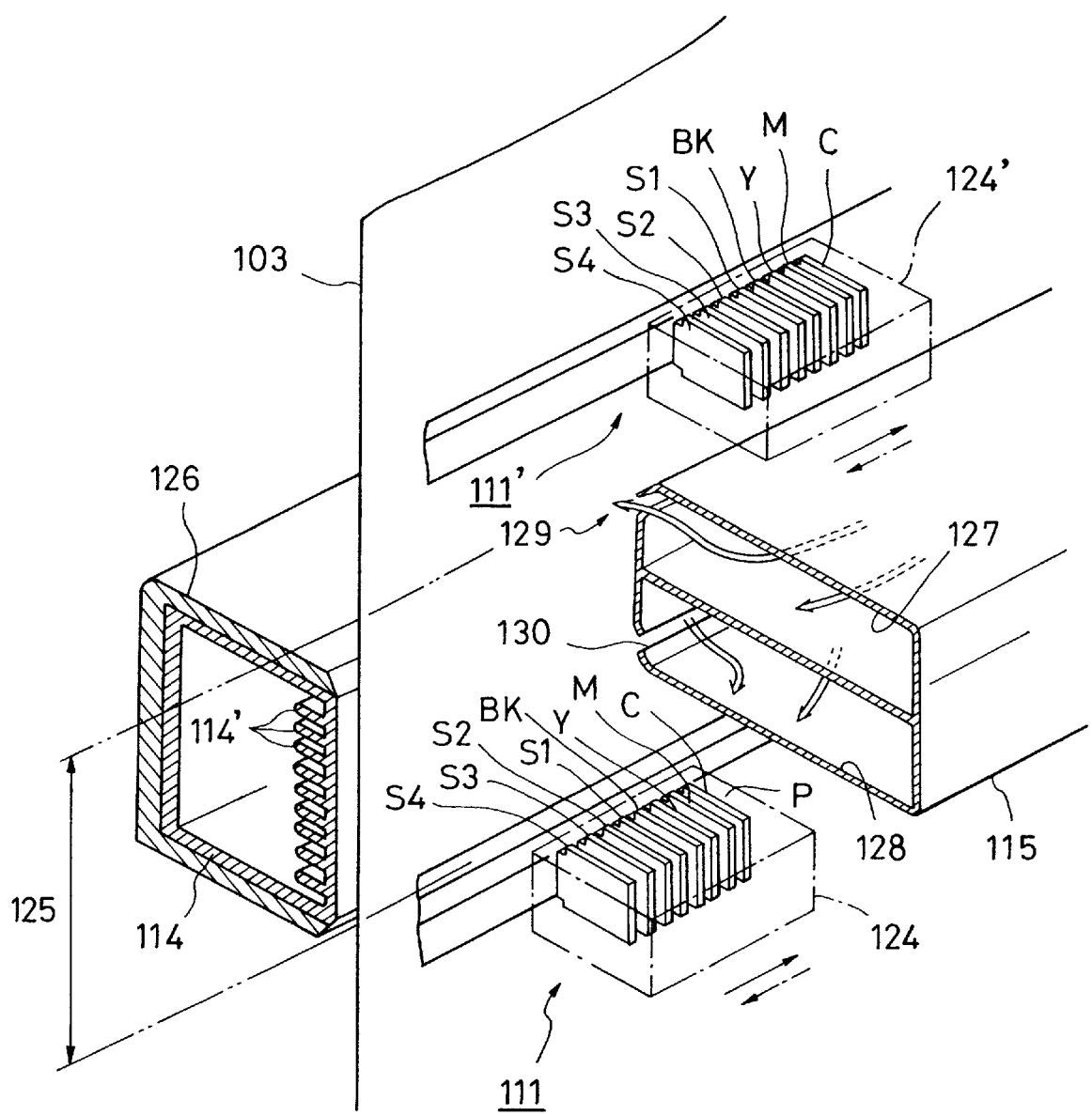
FIG. 5 is a perspective view showing an example of the peripheral construction of printing heads in the first embodiment.

FIG. 4 is a schematic cross-sectional view of an ink-jet printing apparatus serving as the image printing unit 1004 in accordance with the above embodiment of the present invention, and FIG. 5 is an enlarged perspective view of a principal portion of the same apparatus. The image printing unit, i.e., the printing apparatus, of this embodiment roughly comprises the cloth feeding unit 1006 for feeding a roll cloth which was subjected to pre-treatment for textile printing, a body A for printing on the cloth by the ink-jet printing heads while precisely spacing lines, and the post-treatment unit 1008 for drying and winding the printed cloth. The body A further comprises a recording and feeding unit 1007 including platens and precisely feeding the cloth, and an ink-jet recording unit 1005.

The roll cloth 103 which was subjected to pre-treatment is stepwisely sent from the cloth feeding unit 1006 to the body A. In a first printing unit 111, the cloth 3 stepwisely sent is first subjected to printing on the surface side thereof by ink-jet heads 2 with a flat printing surface maintained by a platen 112. The cloth 103 is stepwisely moved at each time printing for one line is completed, and then dried in air. In a second printing unit 111', printing is then carried out on the same portion as the portion printed by the first printing unit 111 by the same method.

The thus-printed cloth 103 is again dried in a post-drying unit 116 using a heater or hot air, guided by a guide roll 117 and then wound by a wind-up roll 118. The cloth 103 wound by the wind-up roll 118 is removed from the apparatus, and subjected to batch treatment such as coloring, washing and drying to obtain a product.

In FIG. 5, the cloth 103 serving as the printing medium is stepwisely moved in the upward direction in the drawing. The first printing unit 111 shown in a lower portion of FIG. 5 comprises a first carriage 124 which can load ink-jet heads for Y, M, C and BK colors and special colors S1 to S4, i.e., a total of eight ink-jet heads 2 (in the drawing, heads Y, M, C and BK and special color heads S1 to S4 are loaded). In this embodiment, each of the ink-jet heads 2 has an element for generating heat energy for producing film boiling in an ink as energy which is utilized for discharging the ink, and 256 discharge openings arranged with a density of 400 DPI (dots/inch).

Although not shown in FIG. 5, an ink supply device is provided for storing an ink and supplying a necessary amount of ink to each of the ink-jet heads, the device having an ink tank and an ink pump. The body of the ink supply device is connected to each of the ink-jet heads 2 and 2' by ink supply tubes or the like so that an ink is automatically supplied to each of the ink-jet heads in an amount of discharge therefrom by capillary action.

During the operation of recovering the ink-jet heads, an ink is forced to be supplied to each of the ink-jet heads by using the ink pump. The heads and the ink supply devices are respectively loaded on separate carriages and are respectively reciprocated by driving devices (not shown) in the directions shown by arrows in FIG. 5.

Although not shown in FIG. 5, a head recovery unit (capping unit) is provided opposite to the heads at the home position (stand-by position) thereof in order to maintain the discharge stability of the heads, as described above. The operations of the head recovery unit include the following:

The operation of capping the heads 2 at the home position for preventing evaporation of inks from the discharge openings of the heads 2 during non-printing operation (capping operation); and The operation of recovering the inks discharged by the operation of forcing inks to discharge from the discharge openings by applying pressure to the insides of the heads using the ink pumps in order to discharge bubbles and dust from the discharge openings before printing of an image is started (pressure recovery operation); or the operation of forcing inks to discharge from the discharge openings by suction (suction recovery operation).

(4) Pre-treatment unit

The pre-treatment unit 1010 is described.

A cloth used for ink-jet textile printing is required to have the following performances:

1. The ability to develop a color of an ink with a sufficient density;
2. High degree of exhaustion of an ink;
3. Rapid drying of an ink on a cloth;
4. Less irregular blurring of an ink on a cloth; and
5. Excellent feeding properties in an apparatus. In order to satisfy these requirements, the cloth can be subjected to pre-treatment comprising adding a treating agent to the cloth in the pre-treatment unit 1010, if required. For example, Japanese Patent Laid-Open No. 62-53492 discloses cloths having ink-receiving layers, and Japanese Patent Publication No. 3-46589 proposes a cloth containing a reduction inhibitor or an alkali substance. An example of such pre-treatment is treatment for adding, to the cloth, a substance selected from an alkali substance, a water-soluble high-molecular weight substance, a synthetic high-molecular weight substance, a water-soluble metallic salt; urea and thiourea.

In the pre-treatment, the method of adding any of the above substances to the cloth is not limited, and a conventional method such as a dipping method, a padding method, a coating method, a spray method or the like can be used.

When a textile printing ink is applied to a cloth for ink jet textile printing, since the ink simply adheres to the cloth, it is preferable to successively perform the step of fixing the dye contained in the ink for printing the fibers of the cloth. Such a fixing step may be carried out by a conventional method such as a steaming method, a HT steaming method or a thermo-fixing method. When a cloth which was not pre-treated with an alkali substance is used, an alkali pad steaming method, an alkali blotch streaming method, an alkali shock method, or an alkali cold-fixing method can be used.

The unreacted dye and the substance used in pre-treatment can be removed by washing with water containing a neutral detergent and hot water using means for washing the printing medium after the fixing step in accordance with a conventional method. During this washing, it is preferable to combine conventional fixing treatment (treatment for fixing the dye which easily separates from the cloth.)

The thus-obtained printed textile can be processed to obtain a processed article. The processed article can be obtained by cutting the ink-jet printed textile to a desired size, and then subjecting the cut piece to steps for obtaining final processed articles. An example of the steps for obtaining final processed articles comprises sewing, and an example of the processed articles is clothes.

Namely, the printed textile subjected to the above post-treatment is cut to a desired size, and is then subjected to the steps of sewing, bonding or welding for obtaining final processed articles to provide clothes such as one-piece dresses, dresses, neckties, swimming suits, etc.; bed covers; sofa covers; handkerchiefs; and curtains. The textile can be sewn in clothes or other daily necessaries by known processing methods.

(5) Method of producing printed textile

An example of the steps of the method of producing the ink jet printed textile is described below.

Figure 6:
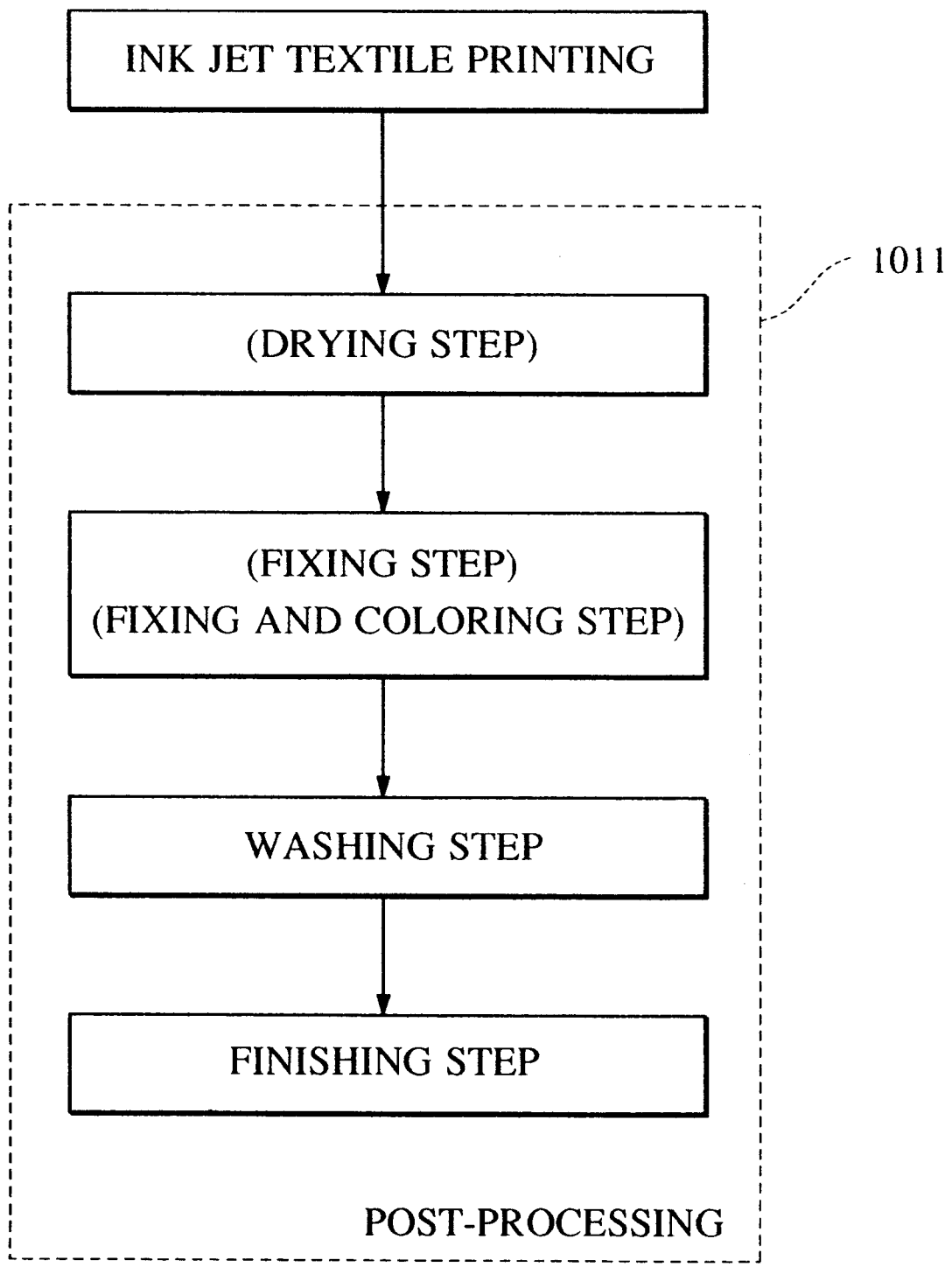
FIG. 6 is a flowchart showing an example of the post-treatment process for printed products.

FIG. 6 is a flowchart illustrating the method. Referring to FIG. 6, the cloth which was subjected to the ink-jet textile printing process is dried (including air drying). The cloth is then subjected to the step of diffusing the coloring material contained in the ink, e.g., a dye or the like, on the fibers of the cloth and fixing the coloring material in the ink to the fibers by using means for fixing the coloring material in the ink. This step can provide sufficient color development and fastness resulting from fixing of the dye.

The diffusion and fixing step (including the dye diffusing step, the fixing and coloring step, etc.) may be carried out by a conventional method such as a steaming method (for example, treatment in an atmosphere of steam at 100° C. for 10 min.). In this case, alkali treatment may be performed as pre-treatment before the textile printing process, as described above. The fixing step includes a reaction step for producing ionic bonds in accordance with the dye used. In a case without such a reaction step, the fibers are impregnated with the coloring material so that the coloring material does not physically separate from the fibers. An ink can be appropriately selected from any inks containing a necessary dye. The coloring material contained in the ink is not limited to a dye, and an ink containing a pigment may be used.

In the subsequent washing step, the unreacted dye and the substance used in the pre-treatment are removed. The finishing step comprising defect correction, ironing, etc. is finally carried out to complete printing.

(6) Procedure for textile printing process

Figure 7:
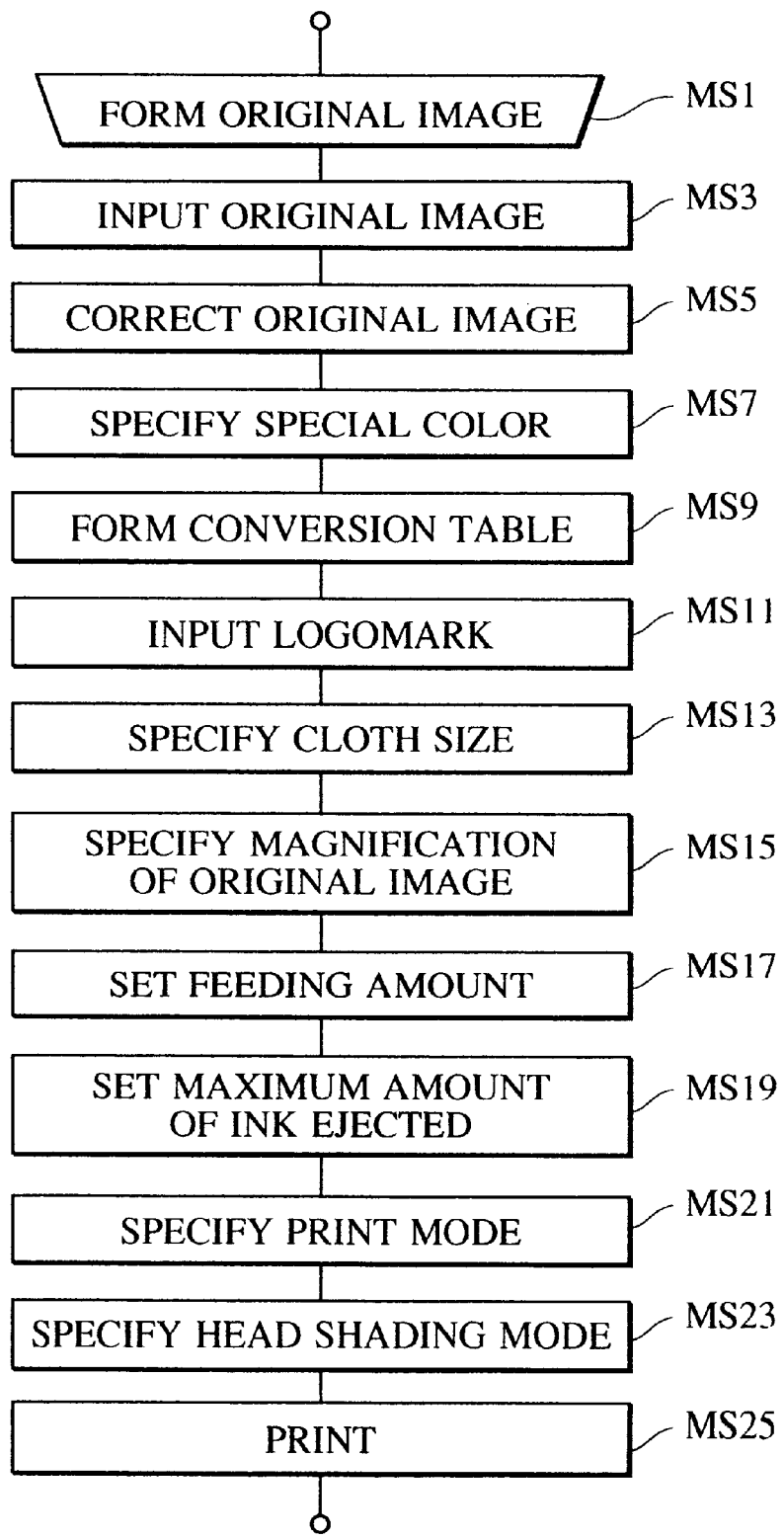
FIG. 7 is a flowchart showing the outline of the procedure for textile printing in the textile printing system of the first embodiment.

The procedure for the textile printing process which can be employed in the ink jet printing system is described. FIG. 7 is a flowchart showing an example of the procedure. The processing in each of the steps is as follows:

Steps MS1 to MS3 of inputting original image

An original image which is formed by a designer using appropriate means, i.e., a basic image as a basic unit of a repeat image on a cloth serving as the printing medium, is read by the reading unit 1001. Alternatively, original image data stored in an external storage device (e.g., a hard disk device) is read, or original image data is received through a network.

Steps MS5 of correcting original image

In the textile printing system of this embodiment, a repeat pattern for the basic image can be selected from various patterns. However, misregistration of an image and discontinuity of a color tone possibly occur at boundaries in accordance with the selected repeat pattern. In this step, the selected repeat pattern is received, and the discontinuity at boundaries of the selected repeat patterns is corrected. In a correction mode, the patterns may be corrected by the designer or operator by using a mouse or another input means in reference to the screen of a display (not shown) connected to the control unit 1009, or may be corrected automatically by the image processing unit 1002.

Step MS7 of specifying special colors.

In the image printing unit 1004 of this embodiment, although printing is basically carried out by using yellow (Y), magenta (M) and cyan (C) inks, or further using a black (BK) ink, it is sometimes desired for textile printing to use clear red (R), green (G), blue (B), etc. in addition to the above colors. The printer of this embodiment thus enables printing in these special colors, i.e., using special color inks. In this step, such a special color is specified.

Step MS9 of correcting image signal

In this step, data for determining a mixing ratio of C, M, Y, BK or a special color is formed for faithfully reproducing the color tone of the original image formed by the designer.

Step MS11 of inputting logomark

For textiles, a logomark such as a brand of a designer or maker is frequently printed at the end thereof. In this step, such a logomark is specified, and the color, size and position thereof are also specified.

Step MS13 of specifying cloth size

The width, length, etc. of a cloth as a printing object are specified. This determines the amounts of horizontal and vertical scanning of the printing heads in the printer and the repeat count of the original pattern.

Step MS15 of specifying original image magnification

The magnification (e.g., 100%, 200% or 400%) of the original image at time of printing is set.

Step MS17 of setting feeding amount

Examples of cloth materials include various materials such as natural fibers such as cotton, silk and wool fibers; and synthetic fibers such as nylon, polyester and acrylic fibers. These materials have different characteristics such as printing characteristics and cloth characteristics. During printing, with the same feeding amount, the state of the line produced at the boundary at each scanning changes with the type of the cloth used. This is possibly caused by differences in stretchability of cloths. In this step, therefore, the type of the cloth used in printing is input, and an appropriate feeding amount for the image printing unit 1004 is set.

Step MS19 of setting maximum amount of ink ejected

Even if the same amount of ink is ejected onto a cloth, the density of an image reproduced on a cloth depends upon the type of the cloth used. The amount of the ink which can be ejected also depends upon the construction of the post-treatment unit in the image printing unit 1004. In this step, therefore, the maximum amount of the ink ejected is specified in accordance with the type of the cloth used and the construction of the post-treatment section of the image printing unit 1004.

Step MS21 of specifying printing mode

A high-speed printing mode or a normal printing mode is specified, or a single ejection of an ink or a plurality of ejections of an ink for one dot is specified. It is also possible to specify that, when printing is interrupted, printing is controlled so that patterns before and after the interruption are continuously printed, or printing is newly started independently of the continuity of patterns.

Step MS23 of specifying head shading mode

When a printing head having a plurality of discharge openings is used in the image printing unit 1004, the amount of the ink discharged or the direction of discharge sometimes varies with the discharge openings of the head due to the variations produced in the production of the head and the conditions of use thereof. Processing (head shading) for keeping the discharge amount constant by correcting a driving signal at every discharge is performed for correcting these variations in discharge characteristics. In this step, timing of the head shading can be specified.

Printing step MS25

Textile printing is executed by the image printing unit 1004 based on the above-described specifications.

If specification in one of the above steps is unnecessary, the unnecessary step may be omitted or skipped. Alternatively, steps for other specifications may be added if required.

(7) Image processing

An example of a series of image processing steps is described below. The construction described below is characteristic of the present invention. An embodiment which uses cyan (C), magenta (M), yellow (Y) and black (BK) inks, low-concentration cyan (light C) and magenta (light M) inks as inks having different dye concentrations, and special color inks S1 and S2 is described.

Figure 8:
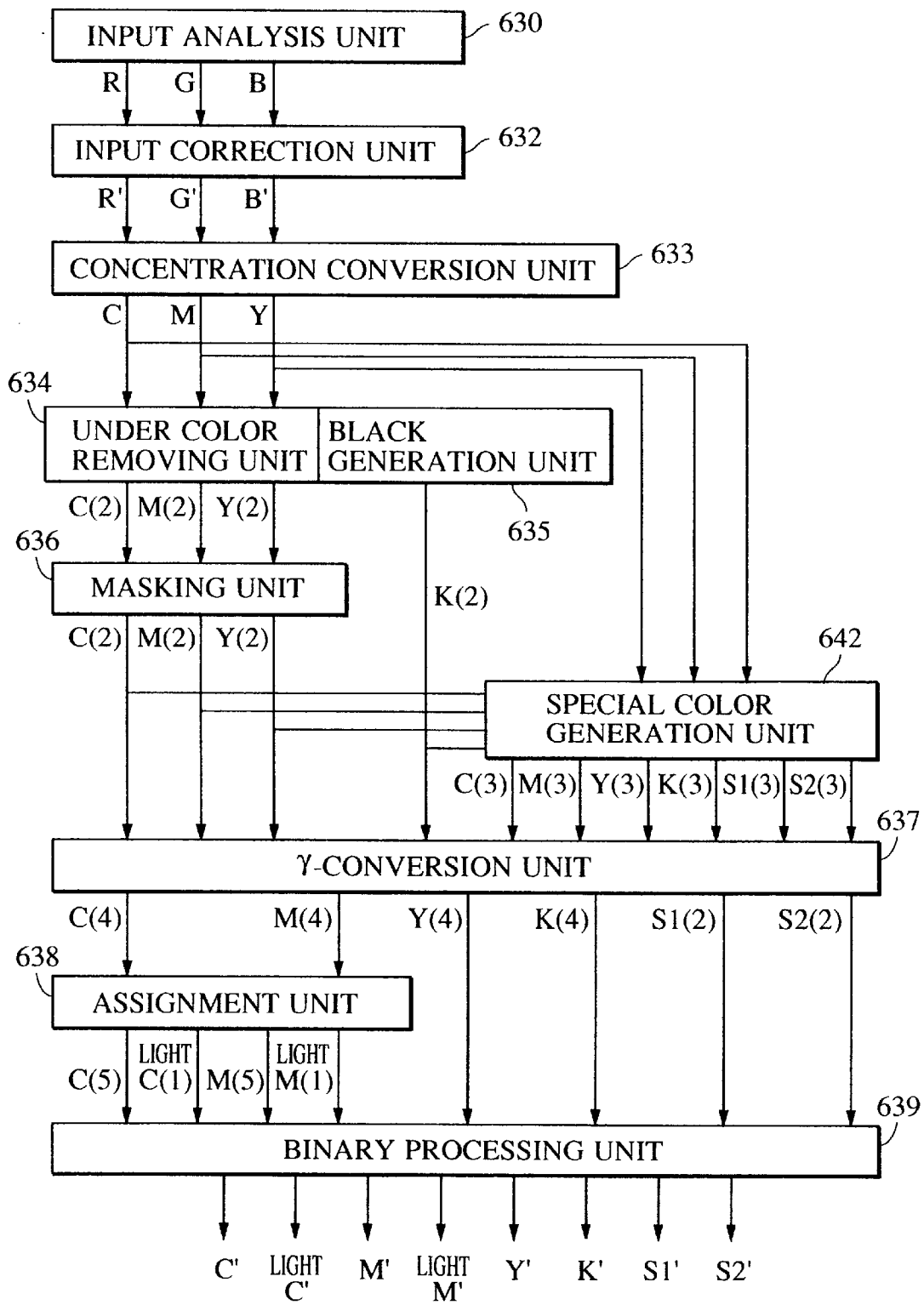
FIG. 8 is a block diagram showing a portion of the outline of an image processing unit in the first embodiment.

FIG. 8 is a block diagram showing an example of the construction of the image processing unit 1002 for converting the signals R, G and B obtained in Step MS3 of inputting the original image shown in FIG. 7 into signals C, M, Y, BK, light C and light M, and generating special color signals S1 and S2 when two special color inks are used.

Original image data (luminance signals) R, G and B are supplied by processing in Steps MS1 and MS2 shown in FIG. 7 through the input analysis unit 630 shown in FIG. 8. An input correction unit 632 converts these signals into standard luminance data R', G' and B' (for example, data R, G and B in the NTSC (National Television System Committee) system for color television) in consideration of the spectral characteristics, dynamic range, etc. of the input image. A density conversion unit 633 converts the standard luminance data R', G' and B' into density data C, M and Y by using nonlinear conversion such as logarithmic conversion or the like. An under color removal unit 634 and a black generation unit 635 perform removal of the under color and black generation, respectively, using the density data C, M and Y, P value indicating a ratio of UCR (Under Color Removal), and a value indicating a ratio of black generation in accordance with the following calculation equations:

$$C(1)=C-\beta \times MIN\ (C, M, Y)$$
$$M(1)=M-\beta \times MIN\ (C, M, Y)$$
$$Y(1)=Y-\beta \times MIN\ (C, M, Y)$$
$$K(1)=K(2)=\alpha \times MIN\ (C, M, Y)$$

Namely, UCR is processing for removing as the under color a gray component of each of data C, M and Y to generate a black signal, i.e., black K, minimum function MIN (C, M, Y) being used for the gray component. The $\beta$ value indicates a ratio of removal of the under color, and the $\alpha$ value indicates a ratio of black generation relative to under color removal.

A masking unit 636 corrects data C(1), M(1) and Y(1) from each of which the under color is removed, by the calculation equations below in consideration of unnecessary absorption characteristics of the inks.

$$C(2) = A11 \times C(1) + A12 \times M(1) + A13 \times Y(1)$$
$$M(2) = A21 \times C(1) + A22 \times M(1) + A23 \times Y(1)$$
$$Y(2) = A31 \times C(1) + A32 \times M(1) + A33 \times Y(1)$$

wherein Aij (ij=1 to 3) is a masking coefficient.

On the other hand, a special color generation unit 642 generates special color density data S1(1) and S2(1) on the basis of the density data C(2), M(2), Y(2) and K(2), which was subjected to masking processing, in accordance with the special colors specified in Step MS7 shown in FIG. 7, and generates new density data C(3), M(3), Y(3) and K(3). Namely, as described below, the density data S1(1) and S2(1) are respectively generated for the specified special colors, and the new density data C(3), M(3), Y(3) and K(3) are generated in accordance with the degrees of relation to the generation of data S1(1) and S2(1).

A $\gamma$-conversion unit 637 converts the data C(3), M(3), Y(3), K(3), S1(1) and S1(1) into data C(4), M(4), Y(4), K(4), K(4), S1(2) and S2(2) each of which is adjusted in output gamma. Namely, a density is corrected so as to establish a linear relation between each of the signals C(4), Y(4), K(4), S1(2) and S2(2) and the density of the image printed by the ink discharged in accordance with each signal.

An assignment unit 638 assigns each of data C(4) and M(4) to two inks having different dye concentrations to generate data C(5), M(5), light C(1), and light M(1). In this case, the data is assigned to data C(5), M(5), light C(1) and light M(1) so as to establish a linear relation between the data and the density of the image printed with the ink discharged in accordance with the signal for each color.

Figure 9:
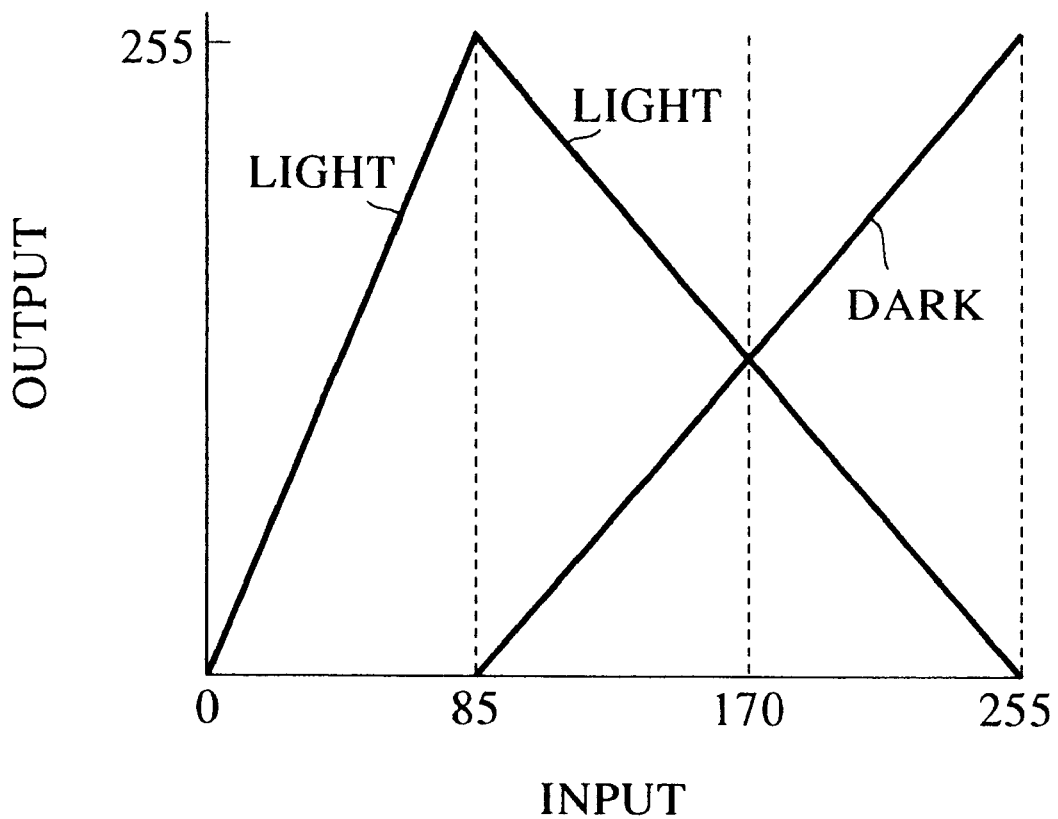
FIG. 9 is a graph showing the concept of a density assignment table in the assignment unit shown in FIG. 8.

FIG. 9 is a graph conceptually showing a density assignment table.

In the density assignment table used in this embodiment, since the concentration ratio between dark and light inks used for each of cyan (C) and magenta (M) is 3:1, only light inks are used up to a density value 85 corresponding to ⅓ of the maximum density of the density values 1 to 255 of an input signal, and conversion is performed so that the input density becomes an output density without any processing. Namely, since the concentration of a light ink is ⅓ of that of a dark ink, on the basis of the concentration of a dark ink, the input density is converted into the output density using a line with a slope of 3 within the range of density values 0 to 85.

On the other hand, both the dark and light inks are used for printing within the range of density values 85 to 255 which are indicated by the input signal. In consideration of the fact that the concentration ratio between dark and light inks is 3:1, conversion is performed for dark and light inks by using lines with slopes of 3/2 and −3/2, respectively, (the intersects with the input axis are 85 and 255, respectively), in order to obtain the output density from the input density without any processing.

A binary processing unit 639 converts multi-valued data C(5), light C(1), M(5), light M(1), Y(4), K(4), S1(2) and S2(2) into binary values so that pseudo-gradation can be formed, to finally generate discharge data C', light C', M', light M', Y', K', S1' and S2'.

As described above, in the textile printing system using the ink-jet printer, when a low-concentration ink is separately prepared for decreasing a feeling of graininess, the numbers of heads and ink tanks are increased, thereby causing the possibility that the size of the apparatus is increased. Thus, in this embodiment, low-concentration inks are used for limited ink colors, i.e., only for colors C and M. The use of the other inks each having a single concentration thus easily produces the problem of a feeling of graininess. Particularly, in the textile printing system, since an ink having a relatively high dye concentration is used for obtaining a sufficient image density, the feeling of graininess becomes significant in a low-density portion printed in the color of the ink having a single dye concentration.

In this embodiment, therefore, a portion of a region, which is printed with a color ink having a single dye concentration, is printed by substituting the color of the ink having a single concentration with two color inks which can realize that color by color mixture, and each of which includes a low-concentration ink other than an ink having a normal concentration, i.e., colors C and M in this embodiment.

In the specification, "color mixture" means either or both of the phenomena that ink dots having different colors are superimposed on the printing medium to form a mixed color, and that dots having different colors are seen as being adjacent to each other, for example, by observation on a microscope, and can be recognized as a result of color mixture by observation with the naked eyes.

The colors C and M of inks each including a low concentration ink are referred to as "basic colors". Those inks are referred to as "process inks". A color expressed as a mixed color can be seen as a color other than the basic colors with the human eyes.

Description will now be made of a case where blue (BL) as a special color is used as the color of an ink having a single dye concentration, and the color BL is substituted by colors C and M in printing, with reference to FIGS. 10 and 11.

Figure 11:
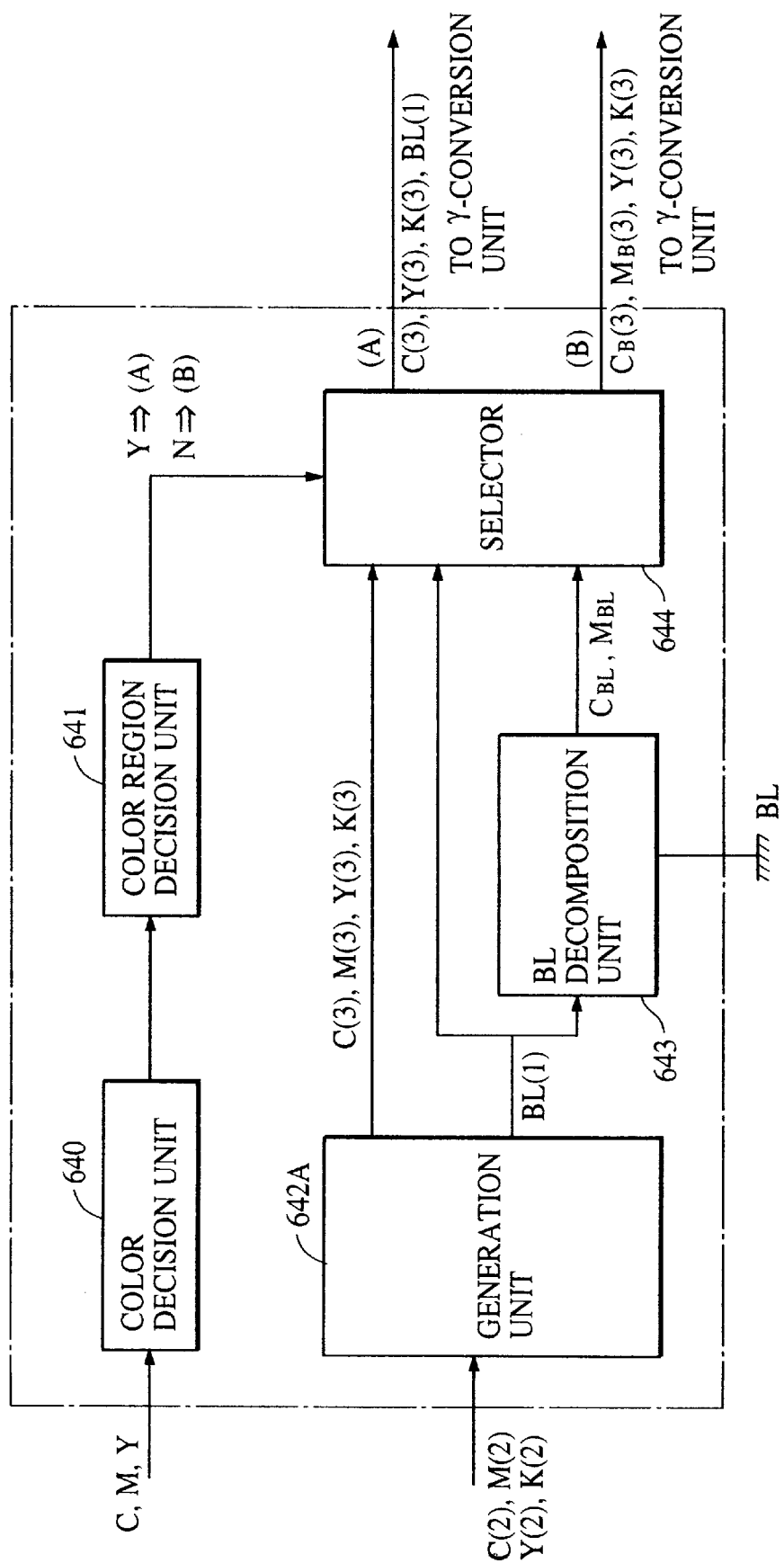
FIG. 11 is a block diagram showing the details of a portion of a structure for the image signal processing.

FIG. 8 is a flowchart showing the processing procedure of the image processing unit 1002 having the construction shown in FIG. 8, and FIG. 11 is a block diagram showing details of the construction of the special color generation unit 642 shown in FIG. 8.

Figure 10:
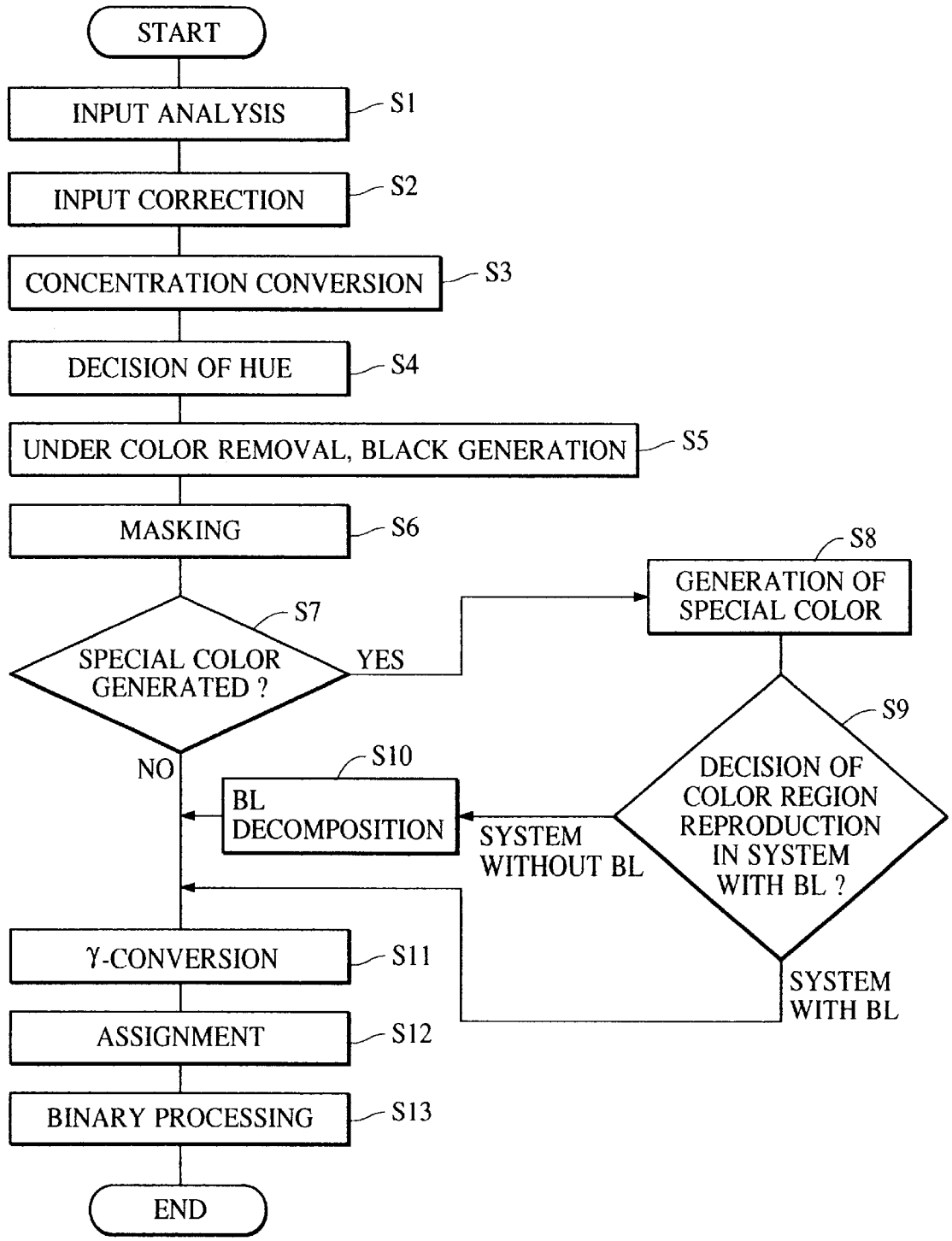
FIG. 10 is a flowchart showing the procedure for processing an image signal when a portion of an area to be reproduced with a BL ink is printed by substituting the BL ink with C and M inks in accordance with the first embodiment of the present invention.

A hue and chroma are decided in Step S4 shown in FIG. 10 by a color decision unit 640 (refer to FIG. 11) of the special color generation unit 642 on the basis of the density data C, M and Y which are obtained by a series of processing comprising input analysis (Step Sl shown in FIG. 10), input correction (Step S2 shown in FIG. 10), and density conversion (Step 3 shown in FIG. 10). At the same time as this processing, processing such as under color removal, black generation (Step S5) and masking (Step S6) are performed in an under color removal unit 634, etc.

Decision is then made based on the special color specified in the Step MS7 as to whether the special color is generated (Step S7). When the decision result is yes, i.e., when it is decided that blue BL is specified as a special color, the generation section 642A (refer to FIG. 11) of the special color generation unit 642 generates data BL(1) on the basis of the density data indicated by the signals C(2), M(2), Y(2) and K(2) output from the masking unit 635 and the black generation unit 635. At the same time, signals C(3) ; M(3), Y(3) and K(3) are generated in accordance with the degrees of relation to the generation of the special color BL (Step S8). For example, when the special color BL is generated by cyan (C) and magenta (M) at a concentration ratio of 2:1, all data on color C having a higher ratio is substituted for the BL data, while data on color M is decreased by an amount corresponding to the concentration ratio 1 which corresponds to the degree of relation to the BL generation. Data on Y and K which are not related directly to the BL generation are output without any processing.

On the other hand, the color area decision unit 641 decides whether or not the hue and chroma decided by the color decision unit 640 are reproduced with an ink system containing the special color (BL) ink (Step S9).

This decision is not necessarily automatically made. For example, the image data obtained by reading the original image by a scanner may be visually observed on a display of a computer by the operator so that an area desired to be expressed in a light special color is specified, and the printer is directed to express this area in a light basic color.

Figure 12:
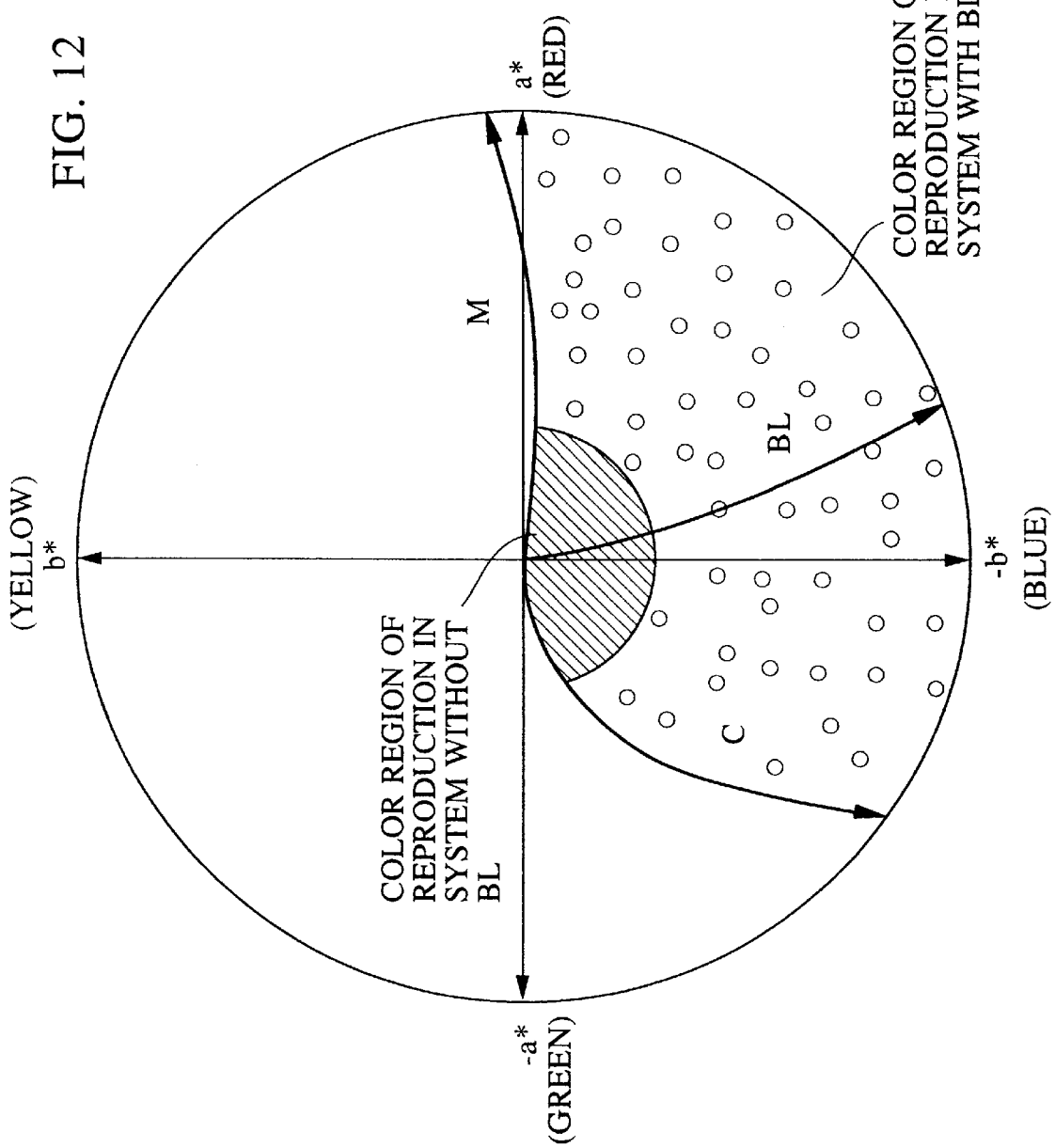
FIG. 12 is a drawing for explaining decision as to whether or not a portion of an area to be reproduced with a BL ink is printed by substituting the BL ink with C and M inks in the first embodiment.

FIG. 12 is a drawing for explaining color decision as to whether or not the color BL is contained. In FIG. 12, a color space is represented by CIE1976 (L* a*b*) space (CIE: Comission Internationale de l'Eclairage), and only the a* b* space is shown.

Namely, in this embodiment, decision is made based on the hue and chroma decided by the color decision unit 640 whether a color is expressed with an ink system containing the BL ink having a single concentration or the color BL to be expressed is expressed by mixing the colors of the other two inks. This decision is made by deciding an area in this color space shown in FIG. 12 where a color having the hue and chroma decided by the color decision unit 640 is present.

In FIG. 12, the origin of the a* b* space indicates an achromatic color, i.e., the L* axis of the CIE1976(L* a* b*) space indicates the achromatic color axis, and the L* coordinate in this color space indicates the lightness of a color.

Each of points in the a* b* space shown as a plane in FIG. 12 indicates a color corresponding to the coordinates of a point. In other words, the hue changes in the circumferential direction around the origin, and the chroma of a hue corresponding to a line extending from the origin changes along the line. The chroma increases in the direction away from the origin.

In FIG. 12, the special color BL (blue) is present in the fourth quadrant in the a* b* coordinate system, as shown by an arrow BL in the drawing (all points on the arrow indicate colors BL having different chromas). A color area which can be reproduced with the color BL and basic colors C and M is an area surrounded by the arrows of colors C and M shown in FIG. 12.

In this embodiment, a color in a portion marked with "0" within this area is expressed by using the BL ink having a single concentration, and a color in a shadowed portion is reproduced by using inks of colors C and M, which are obtained by decomposing the color BL, in place of the use of the color BL. A color in the shadowed portion has a relatively low density and, in most cases, it is reproduced by using inks of colors light C and M, as described below.

When it is decided that a color should be reproduced with an ink system containing the BL ink having a single concentration, a selector 644 (refer to FIG. 11) selects the system (A) shown in FIG. 11, i.e., data C(3), M(3), Y(3), K(3) and BL(1), and transmits the data to the γ-conversion unit 637. As described above with reference to FIG. 8, data C(4), M(4), Y(4), K(4) and BL(2) are obtained by conversion, and then processed by the assignment unit 638 and the binary processing unit 639 to obtain data C", light C', M', light M', Y', K' and BL' (Steps 511, S12 and S13 shown in FIG. 10).

When it is decided that a color should be reproduced with an ink system containing the other two inks used for expressing the color BL, the selector 644 selects system (B) in which data BL(1) generated by the special color generating unit 642 is substituted by data on colors C and M each having a plurality of dye concentrations, which are adjacent to the color BL. Namely, the selector 644 selects system (B) containing the signals CBL and MBL which are produced by BL decomposition (Step S10 shown in FIG. 10) by the BL decomposition unit 643.

In the BL decomposition unit 643, data BL is decomposed into signal CBL related to cyan and signal MBL related to magenta by using functions fc(BL) and fm(BL) which was previously determined by using data BL(1) so as to produce the same color as the color BL. The selector 644 generates new signals CB(3) and MB(3) on the basis of the signals CBL and MBL and the signals C(3) and M(3) obtained from the special color generating unit 642. Namely, the sums of the densities shown by signals CBL and MBL and the densities shown by signals C(3) and M(3) are output as new signals CB(3) and MB(3), respectively. These signals are transmitted to the γ-conversion unit 637 together with signals Y(3) and K(3).

The thus-obtained signals CB(3), MB(3), Y(3) and K(3) are processed by the same method as that for system (A) to obtain signals CB', light CB', MB', light MB', Y' and K'.

In this embodiment, if a portion in the color BL area which should be expressed by mixture of other colors, i.e., the shadowed portion shown in FIG. 12, is denoted by A, A is represented by using hue Ho and chroma C* in the CIE 1976 a* b* L* calorimetric system as follows:

$$A = \{200 \leq Ho \leq 359, 0 \leq C^* \leq 20\}$$

The substitution functions for colors C and M are represented by the following:

fc(BL)=1.0*BL(1)=CBL fm(BL)=0.5*BL(1)=MBL

When the hue of the special color is liable to be affected by one of the two basic colors related to the generation of the special color, the substitution functions may be set so as to intentionally decrease the density value of one of the colors in consideration of the hue of the special color having a very low density. Namely, with the color BL having a very low density, since the presence of magenta color causes a feeling of physical disorder in the hue of the special color, a value, e.g., 3 (the density value with a maximum density of 255), may be subtracted from the MBL value which is calculated by the above equation. In such a case, the data BL is decomposed into data on light C only according to the density of the color BL.

Figure 17:
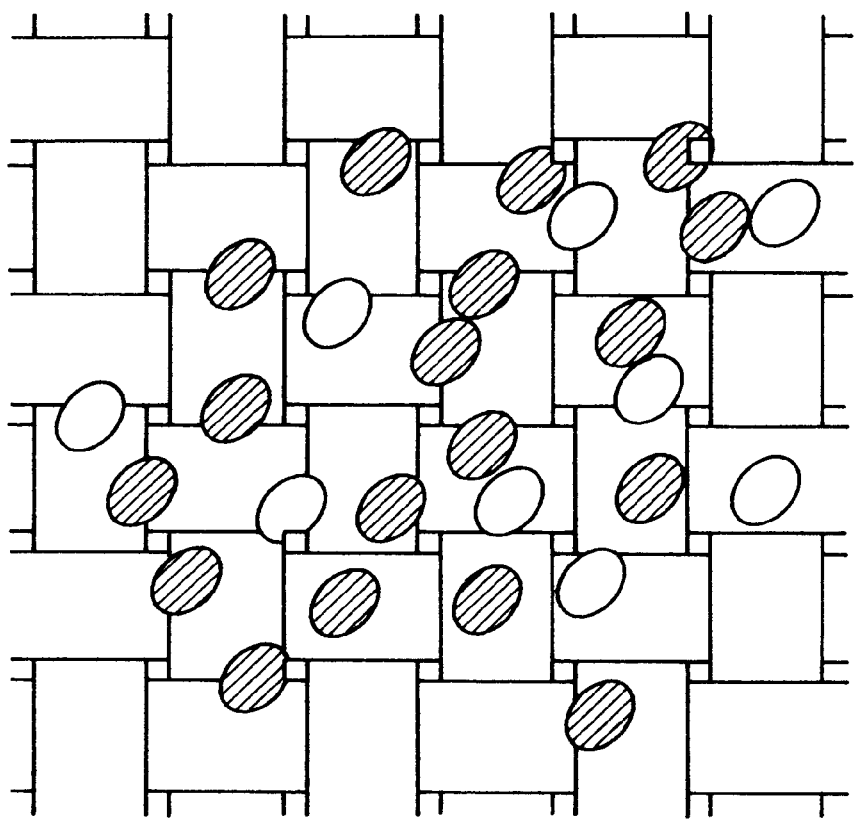
FIG. 17 is a schematic drawing showing the result of printing by the first embodiment of the present invention.

FIG. 17 is a drawing schematically showing the result of printing in accordance with this embodiment. FIG. 17 shows that state where the discharged ink droplets adhere to the fibers which constitute a cloth serving as the printing medium to form dots. FIG. 16 is a similar drawing showing the result of printing by a conventional technique as a comparative example.

In the generation section 642A (refer to FIG. 11) of the special color generating unit 642 (refer to FIG. 8), for example, when the density value indicated by the cyan signal (2) input thereto is 6 (which means a number of dots of deep ink per predetermined area) with a maximum density of 255, and the density value indicated by magenta signal M(2) is 3, the blue signal BL(1) having a density of 6 is generated.

Printing by a conventional technique on the basis of the signal BL(1) indicating the density value 6 produces the result shown in FIG. 16. Namely, six ink dots per predetermined area are formed with an ink of dark blue. In this case, since this density value is relatively low, the dots of the dark ink significantly exhibit a feeling of graininess.

On the other hand, in this embodiment, it is decided by the color area deciding unit 641 (refer to FIG. 11) on the basis of the generated data BL(1) that the blue color is present in the shadowed portion shown in FIG. 12, i.e., the color should be expressed by a mixture of other colors. As a result, the selector 644 (refer to FIG. 11) outputs the signals CB(3) and MB(3) containing the signals CBL and MBL, respectively, by decomposition of data BL(1) by the BL decomposition unit 643 (refer to FIG. 11). The thus-obtained signals are passed through the Reconversion unit 637 (refer to FIG. 8) and then converted into signals corresponding to deep and light inks for colors C and M by the assignment unit 638 using the density assignment table shown in FIG. 9.

When the density indicated by the generated signal BL(1) is 6, as described above, the densities indicated by the signals CB(3) and MB(3) which are output from the selector 644 are 6 and 3, respectively, in accordance with the above-described equations. Each of the signals of cyan and magenta is passed through the γ-conversion unit 637 (refer to FIG. 8) and then assigned to signals corresponding to deep and light inks by the assignment unit 638 (refer to FIG. 8) in accordance with the density assignment table shown in FIG. 9. In this case, since the densities of 6 and 3 of cyan and magenta are low within the input range of 0 to 85 in the table, each of the signals corresponds to a light ink. When each of the densities is converted into a number of dots of a light ink, the signals are converted into signals indicating densities 18 and 9, respectively, thereby producing the result of printing shown in FIG. 17.

As described above, when a portion of a color to be reproduced with a color ink having a single dye concentration is reproduced by substituting that color with other two colors of inks which can form that color by color mixture thereof and each of which has a plurality of dye concentrations, an image having a decreased feeling of graininess can be obtained.

Particularly, a highlight portion which significantly shows a feeling of graininess due to a small number of dots can be reproduced by a sufficient number of dots because such a highlight portion is frequently reproduced by using a light ink having a low dye concentration, thereby enabling an attempt to decrease the feeling of graininess.

The dye concentration of each of the light C and M inks may be 1/10 of that of a dark ink.

(Second Embodiment)

In this embodiment, a color of ink having a single dye concentration is substituted by a mixed color formed by colors of inks each having a plurality of dye concentrations in a stepwise manner according to the hues in the shadowed portion shown in FIG. 12, not a uniform manner for the shadowed portion. Description will now be made of a case which uses color BL as the color of an ink having a single dye concentration, as in the first embodiment.

Figure 13:
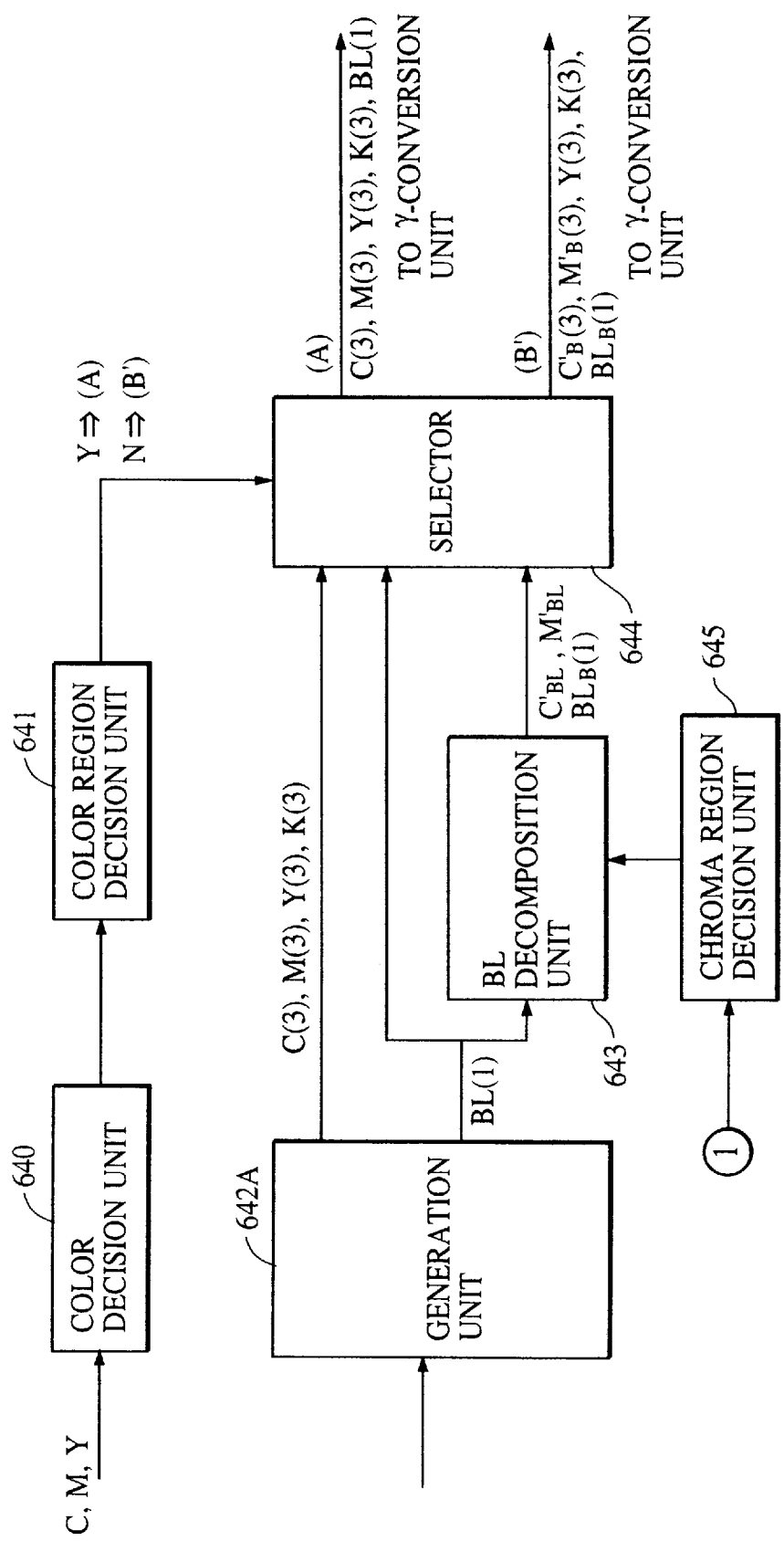
FIG. 13 is a block diagram illustrating the details of a portion of an image signal processing structure in which a portion of an area to be reproduced with a BL ink is printed by stepwisely substituting the BL ink with C and M inks in accordance with a second embodiment of the present invention.

FIG. 13 is a block diagram showing a construction similar to that of the first embodiment shown in FIG. 11.

Figure 14:
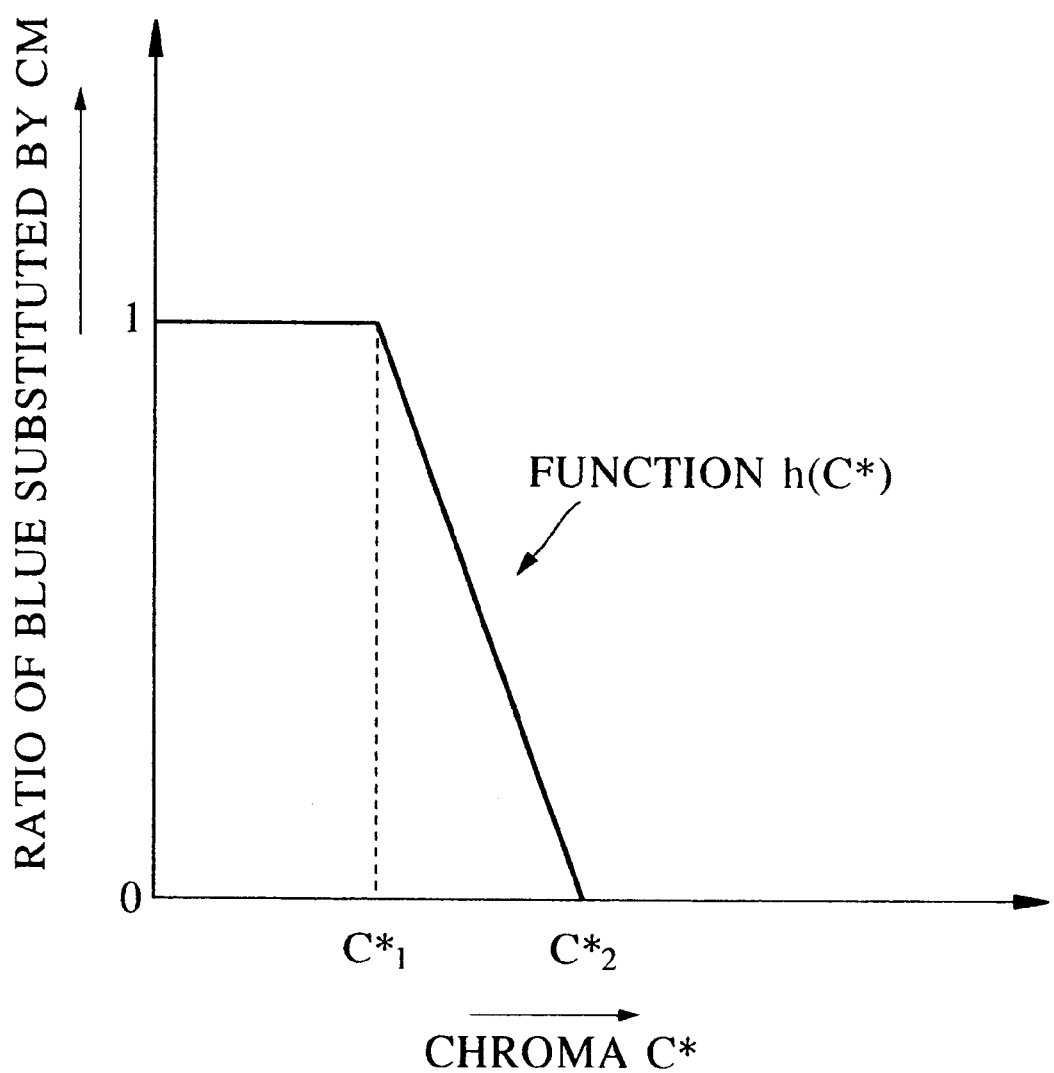
FIG. 14 is a drawing illustrating the relation between the amount of a BL ink substituted by C and M inks and chroma C* in the second embodiment.

In FIG. 13, a chroma area deciding unit 645 decides an amount of data BL'(1) about blue color to be substituted by data about colors C and M each having a plurality of dye concentrations by the BL decomposition unit 643 in accordance with the hue decided by the hue deciding unit 640. This decision is performed by using function h(C*) as shown in FIG. 14. On the basis of the result of this decision, the BL decomposition unit 643 generates signals C', BL, M' and BL by using functions gC(BL) and gm(BL) for the amount of blue data BL'(1).

These data C(3) and M(3) obtained by BL generation are converted into new data C'B(3), M'B(3) and BLB(1) (wherein BLB=BL(1)−BL1(1)) by the selector 644.

FIG. 14 is a graph showing an example of the function h(C*). As shown in FIG. 14, the density of color BL is decomposed into C and M densities up to a predetermined value $C_1^*$ of chroma C*, In this case, the same result of printing as that obtained in the first embodiment can be obtained.

On the other hand, when the value of chroma C* within predetermined values $C_1^*$ and $C_2^*$, the density of BL is decomposed into densities of C and M by the ratio shown in FIG. 14 according to the chroma value.

FIG. 21 is a graph conceptually showing the state of decomposition by the BL decomposition unit 643. FIG. 21 shows the relation between the chroma C* decided by the color decision unit 640 and the density value indicated by signal BL(1), the relation being shown by a straight line which passes through a density value 10 at $C_1^*$ and a density value 30 at $C_2^*$ (the density value with a maximum value of 255).

As shown in FIG. 21, the density indicated by the signal BL(1) input to the BL decomposition unit 643 is decomposed into densities of colors C and M within the density range of 0 to 10, and the density within the range of 10 to 30 are decomposed into densities of colors C and M by a ratio shown by −½×BL(1)+15.

For example, when the density value indicated by the signal BL(1) is 20, since the chroma C* thereof is between the values $C_1^*$ and $C_2^*$, ¼ of the density, i.e., density 5, is decomposed into densities of colors C and M, and the remainder is output as signal BLB(1) as it is, as shown by <2> in FIG. 21,.

For the density value 5 to be decomposed into densities of colors C and M, signals C'BL and M'BL having density values 5 and 2.5, respectively, in accordance with the degrees of relation of colors C and M to the generation of color BL, i.e., the concentration ratio of 2:1 at generation of the color BL, are output.

The signals C'BL and M'BL are finally converted into signals which indicate density values of 15 and 7.5 for light cyan ink and light magenta ink, respectively, which are represented by the number of dots of a light ink, by the density assignment table (refer to FIG. 9) of the assignment unit 638 (refer to FIG. 8).

Figure 18:
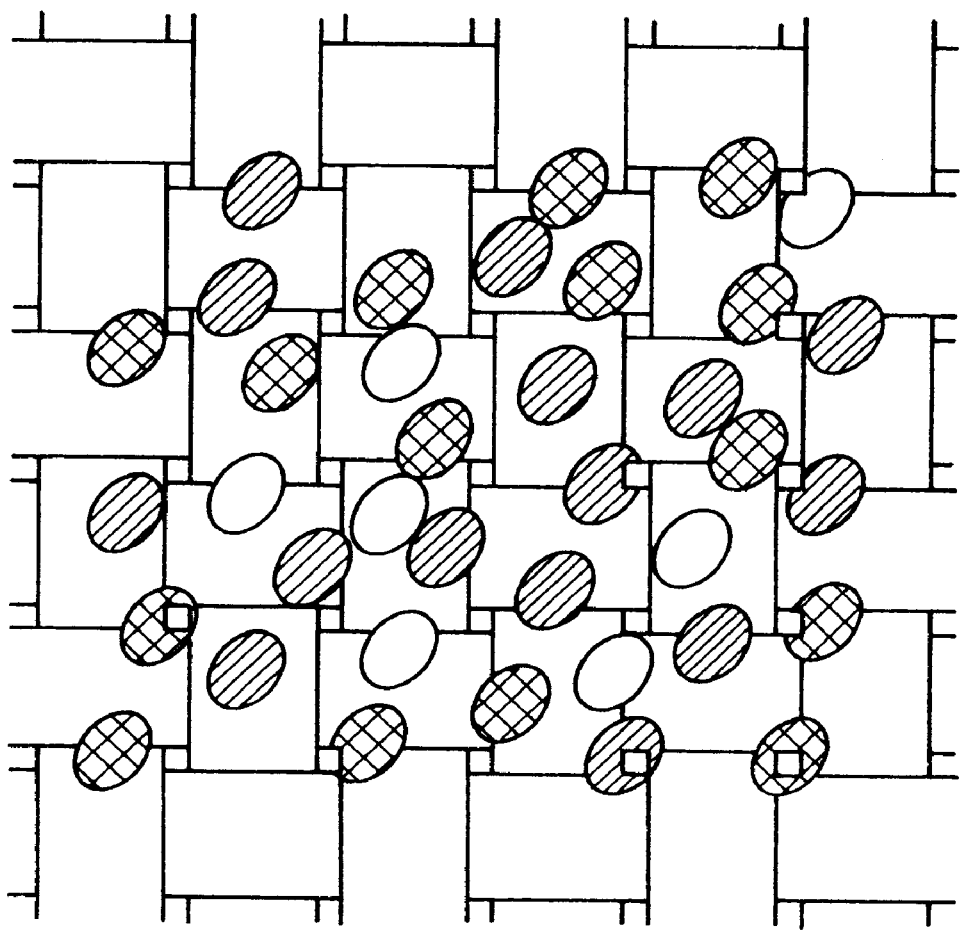
FIG. 18 is a schematic drawing showing the result of printing by the second embodiment of the present invention.

FIG. 18 is a drawing schematically showing the result of printing based on the data obtained by the aforementioned processing.

As shown in FIG. 18, ink dots of BL, light C and light M are formed within a predetermined area with a ratio of about 15. 15. 7.5 by the above-described BL decomposition processing in accordance with the ratio of densities respectively indicated by the signals BL, light C and light M.

When it is decided that the blue color to be reproduced by a system without color BL, the selector 644 selects system (B') and performs the above-described series of processing for converting the signals into signals C'B(3), M"B(3), BLB(1), Y(3) and K(3).

In this embodiment, the color area A to be reproduced by a system containing color BL, and the dye concentration of a light ink are represented by the values described in the first embodiment, and substitution functions for colors C and M are as follows:

$$gc(BL)=1.0*BL'(1)=C'BL$$

$$gm(BL)=0.5*BL'(1)=M'BL$$

The parameter values $C_1^*$ and $C_2^*$ of the function $h(C^*)$ shown in FIG. 14 are 5 and 20, respectively.

In the above equations, a value, for example, 3, may be uniformly subtracted from the value of M'BL for the same reason as described above.

As described above, a portion of a color to be reproduced in the color of an ink having a single dye concentration is reproduced by substituting that color with two colors of inks which can form that color by color mixture and each of which has a plurality of dye concentrations. The amount of the color substituted is stepwisely changed in accordance with the hue of a color to be reproduced, thereby decreasing the slight color deviation caused by the substitution, and obtaining a smooth gradation image with a decreased feeling of graininess.

(Third Embodiment)

In this embodiment, a color area to be reproduced by mixing a plurality of inks each having a plurality of dye concentrations in place of an ink having a single dye concentration is decided in accordance with the input density level of the ink having a single dye concentration.

Description will be made of a case which uses a BL ink as an ink having a single dye concentration, as in the first and second embodiments.

Figure 15:
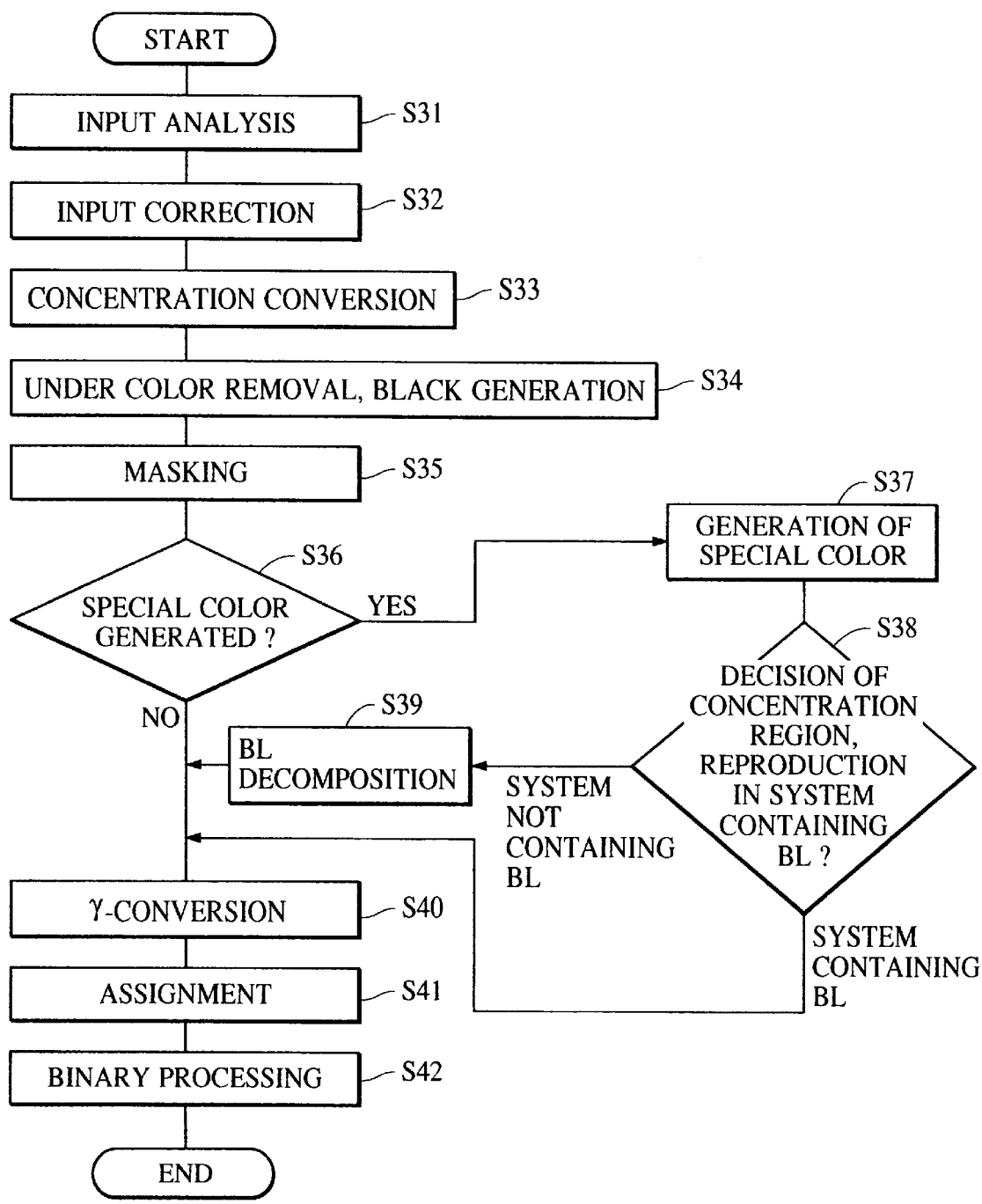
FIG. 15 is a flowchart showing a portion of the processing procedure of an image processing unit when an image area to be reproduced with a BL ink is decided on the basis of the density level of the BL ink in accordance with a third embodiment of the present invention.

FIG. 15 is a flowchart showing the processing procedure of an image processing unit in accordance with this embodiment, and is similar to FIG. 10.

In FIG. 15, decision of a density area is made on the basis of the density value indicated by data BL(1) generated by the generation section of the special color generation unit. Decision is made on the basis of the result of the above decision of a density area as to whether or not the color BL is reproduced by a system containing color BL (Step S38 shown in FIG. 15). Namely, decision is made as to whether or not the color BL is substituted by colors C and M of inks which can form the BL by color mixture and each of which has a plurality of dye concentrations. Specifically, if the decided density value B is BL(1)≦B, data BL(1) is decomposed into data on colors C and M, and if BL(1)>B, data BL(1) is used without decomposition.

In this embodiment, the dye concentration of a light ink is ¹⁄₁₀ of that to a dark ink, and the decided density value B is 30 (with a maximum value of 255). The substitution functions used for substituting BL(1) with colors C and M are the same as those used in the first or second embodiment.

In this way, a color area to be reproduced by inks each of which has a plurality of dye concentrations and which can form a color by color mixture in place of the use of an ink having a single dye concentration is decided in accordance with the input density level of the ink having a single dye concentration. This reproduction can produce the same effects as those obtained in the first and second embodiments. In addition, the feeling of graininess of a special color in a portion other than a highlight portion can be decreased by using the basic colors as under colors. Namely, since a color to be reproduced by mixing colors with a very low density ratio of the special color to that of the basic colors is reproduced with the basic colors of inks having a plurality of different dye concentrations in place of the special color ink having a single dye concentration, a smooth image can be obtained.

The print examples respectively shown in FIGS. 19 and 20 and described below can be obtained by printing in accordance with the first to third embodiments.

FIG. 19 shows an example in which printing is carried out with an ink system (A) containing color BL because the density indicated by signal BL(1) is relatively high. Namely, printing is carried out with the special color ink BL on the basis of the density indicated by the signal BL. In this case, BL decomposition is shown by <3> in FIG. 21.

The BL decompositions shown by <0> and <1> in FIG. 21 are related to the conventional example in which data BL is used without decomposition, and the first embodiment in which all data BL is decomposed, shown in FIGS. 16 and 17, respectively.

Figure 20:
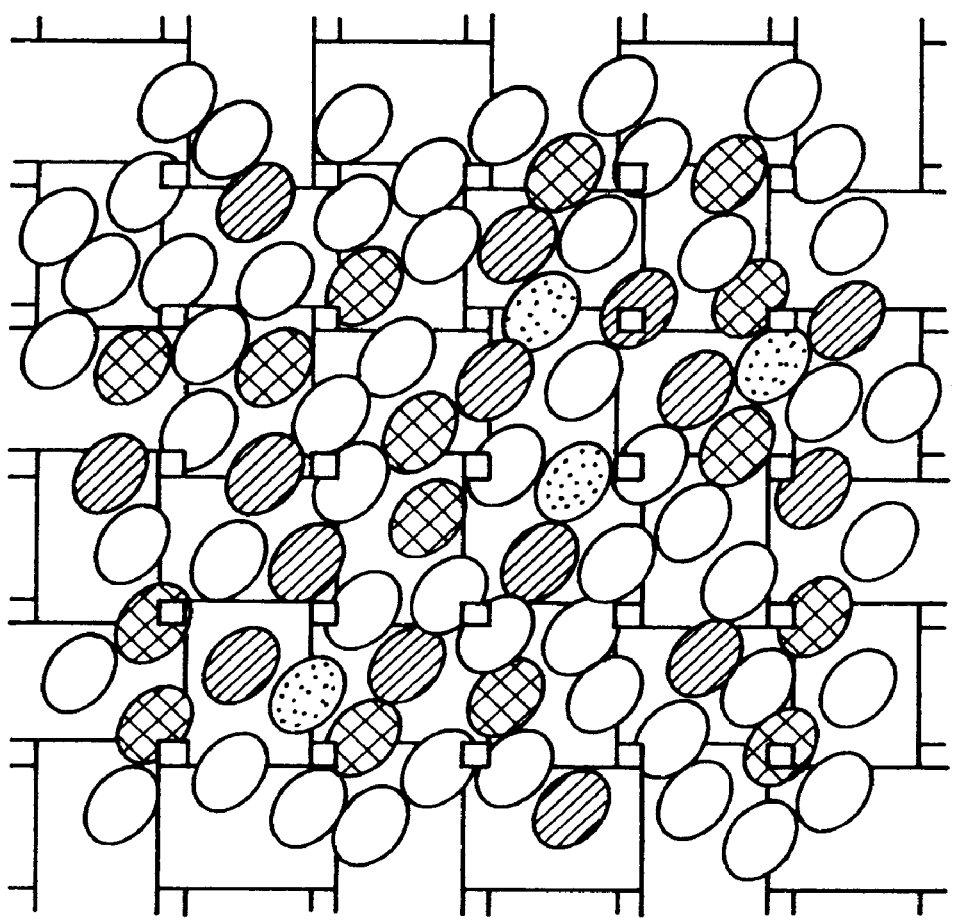
FIG. 20 is a schematic drawing showing another example of the result of printing by each of the embodiments of the present invention.

FIG. 20 shows an example in which a blue BL color is specified as a special color, and signal M(2) indicates excess density when signal BL(1) is generated from signals C(2) and M(2). In addition, the hue C* indicated by the signal BL(1) generated is the same as the result of printing in the second embodiment in which a portion of the color BL is decomposed.

In each of the examples shown in these drawings, the densities indicated by the signals BL(1) and M(3) output from the generation section 642A (refer to FIG. 13) are 20 and 85, respectively, and the ratio of the densities indicated by the signals C(2) and M(2) used for generating the signal BL(1) is 2.1, which is the same as in the above embodiments. Further, the densities indicated by signals BL, M, light M and light C finally become 15, 4, 251 and 15, respectively, by using the density assignment table shown in FIG. 9, and dots are formed in a predetermined area in a number corresponding to the ratio of the densities.

(Fourth Embodiment)

In this embodiment, a portion of a color area to be reproduced with a color of an ink having a single dye density is reproduced by substituting that color with color mixture containing one of colors of inks which can form that color by color mixture and each of which has a plurality of different dye concentrations.

Description will be made of a case which uses special color Gr (green) as a color of an ink having a single dye density.

In this embodiment, when it is decided by the decision method employed in the first, second and third embodiments that the color Gr is not reproduced on the basis of data Gr(1) generated by the special color generation unit, color C is reproduced by substituting data Gr(1) with data on color C which can form the color Gr by color mixture and which has a plurality of different dye concentrations, and data on color Y which can form the color Gr by color mixture and which has a single dye concentration. This substitution may be carried out by the method employed in any one of the first, second and third embodiment.

In this way, when there is at least one color of an ink having a plurality of different dye concentrations, for example, the cyan color C, as a color which can form green color Gr by color mixture with another color, a portion of the area to be reproduced by a color of an ink having a single dye concentration, such as green color Gr, is reproduced by substituting the green color with a mixed color of a color of an ink having a plurality of dye concentrations, such as the color C, and the other color Y. This permits an attempt to decrease the graininess of a highlight portion.

Although the ink-jet textile printing system for printing on a cloth is described in detail above with reference to each of the above-described embodiments, the printing medium is not limited to the cloth, and other mediums such as plain paper, coated paper, OHP sheets, etc., may be used.

(others)

It is preferable to use the basic principle disclosed in, for example, U.S. Pat. Nos. 4,723,129 and 4,740,796. This system can be applied to a so-called on-demand type or continuous type apparatus. In particular, the on-demand type is effective because heat energy is generated in an electro-thermal converter which is disposed opposite to a sheet containing a liquid (ink) and a liquid passage by applying, to the electro-thermal converter, at least one driving signal for rapidly increasing the temperature above the temperature of nucleate boiling in correspondence with recording information to produce film boiling in the thermal action surface of the recording head. As a result, bubbles are formed in the liquid (ink) in one-to-one correspondence with the driving signal. The liquid (ink) is discharged from a discharge opening due to the growth and contraction of the bubble to form at least one droplet. The driving signal in a pulse form is more preferable because the bubble is instantaneously and appropriately grown and contracted, thereby achieving discharge of the liquid (ink) with excellent responsibility. The driving signals disclosed in U.S. Pat. Nos. 4,463,359 and 4,345,262 are suitable as such pulse-formed driving signals. More excellent recording can be performed by employing the conditions disclosed in the invention of U.S. Pat. No. 4,313,124 which relates to the rate of temperature rise of the thermal action surface.

The present invention includes not only the structure of the recording head comprising the combination of a discharge opening, a liquid passage (a linear liquid passage or a right angle liquid passage) and an electro-thermal converter, as disclosed in each of the above specifications, but also the structures disclosed in U.S. Pat. Nos. 4,558,333 and 4,459,600 in which a thermal action portion is disposed in a bent region.

The present invention is also effective for structures based on the structure disclosed in Japanese Patent Laid-Open No. 59-123670 in which a common slit is provided as a discharge portion for a plurality of electro-thermal converters, and the structure disclosed in Japanese Patent Laid-Open No. 59-138461 in which an opening for absorbing the pressure wave of thermal energy is provided opposite to a discharge portion.

Further, the present invention can effectively be applied to a full-line type recording head having a length corresponding to the maximum width of recording media on which the recording apparatus can record images. Such a recording head may comprise a combination of a plurality of recording heads which satisfy the length of the recording head, or a single recording head which is integrally formed.

The recording head used may be an exchangeable chip type which permits electrical connection to the apparatus body and supply of ink from the apparatus body when being mounted thereon, or a cartridge type having an ink tank which is provided integrally with the recording head.

It is also preferable to add as components discharge recovery means for the recording head, preliminary auxiliary means and the like to the recording apparatus of the present invention because the effects of the invention can further be stabilized. Examples of such means include capping means for the recording head, cleaning means, pressure or suction means, preheating means for heating by using an electro-thermal converter or another heating element or a combination thereof, and pre-discharge means for discharging ink separately from recording.

The recording apparatus of the present invention may be provided with not only a recording mode for a main color such as black or the like but also at least one of full-color modes for a plurality of different colors and color mixture whether the apparatus comprises an integral recording head or combination of a plurality of heads.

In any cases, the use of the ink-jet textile recording apparatus system in which an image is printed by a dot pattern using digital image processing eliminates the need for a continuous cloth on which the same pattern is repeated as in a conventional textile printing method. Namely, patterns necessary for producing various types of clothes are printed adjacent to each other on a cloth in consideration of the sizes and external shapes thereof, thereby minimizing a cloth portion which is not used after cutting.

Namely, patterns used for completely different clothes can be printed adjacent to each other on a cloth and then cut. This cannot be achieved by a conventional method.

When patterns for various clothes which have different sizes, required numbers of products and forms (designs) are printed adjacent to each other on the same cloth, as described above, cutting lines and sewing lines can be drawn by using the same textile printing system, and the production efficiency is thus increased.

In addition, since the cutting lines and sewing lines can be drawn by using digital image processing, they can be effectively drawn according to plan, and the patterns can readily be matched at the time of sewing. The direction of cutting can synthetically be set to the direction of texture or a bias direction in a data processing device in accordance with the shapes and designs of patterns to form a layout of the patterns on a cloth.

Further, the cutting lines and sewing lines can be drawn by using a coloring material which can be removed by washing or the like after production, unlike a dye of a textile printing ink.

Since no ink is required to be adhered to a portion of a raw fabric unnecessary to finish into clothes, the ink can effectively be used.

The ink which is preferably used in the present invention could be prepared as follows:

(1) Reactive dye (C. I. Reactive Yellow 95)

|                  |                    |
|------------------|--------------------|
|                  | 10 parts by weight |
| Thiodiglycol     | 10 parts by weight |
| Diethylene glycol| 20 parts by weight |
| Water            | 60 parts by weight |

The above components were mixed and agitated for 1 hour, and the pH was adjusted to 7 with NaOH, followed by agitation for 2 hours. The resultant mixture was then filtered by using a Fluoro Porefilter FP-100 (trade name, produced by Sumitomo Denko Co., Ltd.) to obtain an ink.

(2) Reactive dye (C. I. Reactive Red 24)

|                  |                    |
|------------------|--------------------|
|                  | 10 parts by weight |
| Thiodiglycol     | 15 parts by weight |
| Diethylene glycol| 10 parts by weight |
| Water            | 60 parts by weight |

An ink was prepared by the same method as that for the above ink (1).

(3) Reactive dye (C. I. Reactive Blue 72)

|              |                    |
|--------------|--------------------|
|              | 8 parts by weight  |
| Thiodiglycol | 25 parts by weight |
| Water        | 67 parts by weight |

An ink was prepared by the same method as that for the above ink (1).

(4) Reactive dye (C. I. Reactive Blue 49)

|              |                    |
|--------------|--------------------|
|              | 12 parts by weight |
| Thiodiglycol | 25 parts by weight |
| Water        | 63 parts by weight |

An ink was prepared by the same method as that for the above ink (1).

(5) Reactive dye (C. I. Reactive Black 39)

|                 |                    |
|-----------------|--------------------|
|                 | 10 parts by weight |
| Thiodiglycol    | 15 parts by weight |
| Diethyleneglycol| 15 parts by weight |
| Water           | 60 parts by weight |

An ink was prepared by the same method as that for the above ink (1).

As described above, the present invention can reproduce a low-density portion which to be reproduced with an ink having a single concentration with a low-concentration ink of inks which can form the color of the ink having a single concentration by color mixture.

As a result, a smooth image which is decreased in graininess which easily occurs, particularly, in a low-density highlight portion can be obtained.

What is claimed is:

1. In ink-jet printing apparatus for printing an image by discharging, onto a printing medium from ink-jet heads based on image data of an image to be printed, a plurality of inks of basic colors, at least one basic color of which includes a plurality of inks having different colorant concentrations, and a special color ink having a single colorant concentration and a special color other than the basic colors, which is a color between two basic colors of the plurality of basic colors in a color space, said apparatus comprising:

decision means for deciding whether or not a color indicated by said image data is the special color and is present in a predetermined portion within a range which is expressible in the basic colors in the color space; and substitution means for substituting at least a portion of data of the special color in the image data with data of at least one color of the two basic colors when said decision means decides that the color indicated by said image data is the special color in the predetermined portion, wherein a relatively low density portion of the image of at least the special color is formed, instead of using the special color ink, by mixing the plurality of the basic color inks, at least one of the plurality of basic color inks having a colorant concentration relatively lower than a colorant concentration of other basic color inks of the same color, and a portion of the image of at least the special color and having a density relatively higher than that of the low density portion of the image is formed using the special color ink.

2. An ink-jet printing apparatus according to claim 1, wherein said substitution means performs assignment of the color to be substituted of the two basic colors and substitution therefor.

3. An ink-jet printing apparatus according to claim 1, wherein said decision means performs decision based on a result of a decision as to whether or not the color indicated by the image data has a hue and chroma within predetermined ranges.

4. An ink-jet printing apparatus according to claim 1, wherein said substitution means performs assignment of inks having lower colorant concentrations among the basic color inks including a plurality of inks having different colorant concentrations and substitution therefor.

5. An ink-jet printing apparatus according to claim 1, wherein said decision means performs decision based on a result of a decision as to whether or not an optical density of the color other than said basic colors in the image data is less than a predetermined value.

6. An ink-jet printing apparatus according to claim 1, wherein the basic colors include at least one of cyan, magenta and yellow colors.

7. An ink-jet printing apparatus according to claim 1, wherein the special color comprises at least one color of red, blue and green colors.

8. An ink-jet printing apparatus for printing an image by discharging, onto a printing medium from ink-jet heads, inks of basic colors, at least one basic color of which includes a plurality of inks having different colorant concentrations, and ink of a special color having a single colorant concentration and a hue between hues of the at least one basic color and another basic color, said apparatus comprising:

decision means for deciding a degree of a relation of special color data to other color data of an image to be printed; and assignment substitution means for assigning at least a portion of data of the special color in data of the image to data of the at least one and another basic colors and substituting the portion of data with the at least one and another basic colors when the degree decided by said decision means is within a predetermined range, wherein a relatively low density portion of the image of at least the special color is formed, instead of using the special color ink, by mixing the plurality of the basic color inks, at least one of the plurality of basic color inks having a relatively low colorant concentration, and a portion of the image of at least the special color and having a density relatively higher than that of the low density portion of the image is formed using the special color ink.

9. An ink-jet printing apparatus according to claim 8, wherein the basic colors include at least one of cyan, magenta and yellow colors.

10. An ink-jet printing apparatus according to claim 8, wherein the special color comprises at least one color of red, blue and green colors.

11. An ink-jet printing apparatus according to claim 8, wherein the printing medium comprises a cloth.

12. An ink-jet printing apparatus according to claim 8, wherein each of said ink-jet heads comprises a thermal energy generator for discharging ink by utilizing thermal energy.

13. An ink-jet printing apparatus according to claim 8, further comprising means for washing the printing medium after fixing of the printed inks.

14. An ink-jet printing apparatus according to claim 8, further comprising means for adding a pre-treatment agent to the printing medium before printing.

15. An ink-jet printing apparatus according to claim 8, further comprising means for fixing a coloring material contained in an ink to the printing medium.

16. An ink-jet printing method of printing an image by discharging, to a printing medium from ink-jet heads, inks of basic colors, at least one basic color of which includes a plurality of inks having different colorant concentrations, and ink of a special color which has a single colorant concentration and a hue between hues of the at least one basic color and another basic color, said method comprising the steps of:

providing the ink-jet heads; and printing a relatively low density portion of the image of at least the special color, instead of using the special color ink, by mixing the plurality of the basic color inks, at least one of the plurality of basic color inks having a colorant concentration relatively lower than a colorant concentration of other basic color inks of the same color; and printing a portion of the image of at least the special color and having a density relatively higher than that of the low density portion of the image using the special color ink.

17. An ink-jet printing method according to claim 16, wherein the basic colors include at least one of cyan, magenta and yellow colors.

18. An ink-jet printing method according to claim 16, wherein the special color comprises at least one color of red, blue and green colors.

19. A method of forming an ink-jet printed product comprising the steps of:

providing an ink-jet printing apparatus which discharges a plurality of inks of basic colors and ink of a special color having a hue between hues of two of the basic colors; and forming the image on the printing medium by discharging a plurality of inks each having different colorant concentrations for at least one of the colors of the plurality of basic color inks, wherein a relatively low-density portion of an image of at least the special color is formed in the forming step, instead of using the special color ink, by mixing the plurality of basic color inks, at least one of which has a colorant concentration relatively lower than a colorant concentration of other basic color inks of the same color, and a portion of the image of at least the special color and having a density relatively higher than that of the low density portion of the image is formed in the forming step using the special color ink.

20. A method according to claim 19, wherein the basic colors include at least one of cyan, magenta and yellow colors.

21. A method according to claim 19, wherein the special color comprises at least one color of red, blue and green colors.

22. An ink-jet printing apparatus for printing an image by discharging, onto a printing medium from ink-jet heads based on image data of an image to be printed, a plurality of inks of basic colors, at least one basic color of which includes a plurality of inks having different colorant concentrations, and a special color ink having a single colorant concentration and a special color other than the basic colors, which is a color between two basic colors of the plurality of basic colors in a color space, said apparatus comprising:

means for generating color data; and substitution means for substituting at least a part of data of the special color and a color in a predetermined portion within a range which is depictable in the two basic colors with data of at least one of the two basic colors, wherein a relatively low density portion of the image of at least the special color is formed, instead of using the special color ink, by mixing the plurality of the basic color inks, at least one of the plurality of basic color inks having a colorant concentration relatively lower than a colorant concentration of other basic color inks of the same color, and a portion of the image of at least the special color and having a density relatively higher than that of the low density portion of the image is formed using the special color ink.

23. An ink-jet printing apparatus according to claim 22, wherein the basic colors include at least one of cyan, magenta and yellow colors.

24. An ink-jet printing apparatus according to claim 22, wherein the color other than the basic colors comprises at least one of red, blue and green colors.

25. An ink-jet printing apparatus according to claim 22, wherein the printing medium comprises a cloth.

26. An ink-jet printing apparatus according to claim 22, wherein said ink-jet heads comprise thermal energy generators for discharging inks by using thermal energy.

27. An ink-jet printing method of printing an image by discharging, to a printing material from ink-jet heads, inks of basic colors, at least one basic color of which includes a plurality of inks having different colorant concentrations, and ink of a special color, which has a single colorant concentration and a hue between hues of the at least one basic color and another basic color, said method comprising the steps of:

providing the ink-jet heads; and printing a portion of an image to be printed in a color other than the basic colors, with a lower-colorant-concentration ink of the basic color inks, the lower-colorant-concentration ink having a colorant concentration relatively lower than a colorant concentration of other basic color inks of the same color, wherein a relatively low density portion of the image of at least the special color is formed, instead of using the special color ink, by mixing the plurality of the basic color inks, and a portion of the image of at least the special color and having a density relatively higher than that of the low density portion of the image is formed using the special color ink.

28. An ink-jet printing method according to claim 27, wherein the basic colors include at least one of cyan, magenta and yellow colors.

29. An ink-jet printing method according to claim 27, wherein the special color comprises at least one color of red, blue and green colors.

30. A method of forming an ink-jet printed product comprising the steps of:

supplying a printing medium; and printing a plurality of ink dots on the printing medium to form an image area, the plurality of ink dots printed in said printing step including dots of a plurality of inks of basic colors and dots of a special color ink of a special color other than the basic colors, wherein the plurality of ink dots printed in said printing step include dots of at least one of the basic colors including dots having different optical densities, the image area includes an area which is visually perceived as the special color, and wherein a relatively low density portion of the image area of at least the special color includes, instead of dots of the special color, mixed dots of the plurality of basic colors, and a portion of the image of at least the special color and having a density relatively higher than that of the low density portion of the image includes dots of the special color.

31. A method according to claim 30, wherein the special color is a color between two basic colors of the plurality of basic colors in a color space.

32. A method according to claim 30, wherein the special color ink has a single concentration.

33. A method according to claim 30, wherein the basic colors include at least one of cyan, magenta and yellow colors.

34. A method according to claim 30, wherein the special color comprises at least one color of red, blue and green colors.

35. A method of forming a processed product comprising the steps of:

providing a printing medium;

printing a plurality of ink dots on the printing medium in an image area, wherein the plurality of ink dots printed in said printing step include dots of a plurality of inks of basic colors and dots of a special color ink of a special color other than the basic colors, dots of at least one of the basic colors include dots having different optical densities, wherein the image area includes an area which is visually perceived as the special color, and wherein a relatively low density portion of the image area of at least the special color includes, instead of dots of the special color, mixed dots of the plurality of the basic colors, and a portion of the image of at least the special color and having a density relatively higher than that of the low density portion of the image includes dots of the special color; and processing the recording medium printed in said printing step.

36. A method according to claim 35, wherein said processing step comprises cutting said ink-jet printed product to a desired size and subjecting the cut printed product to further processing for obtaining a final product.

37. A method according to claim 36, wherein said further processing comprises sewing.

38. A method according to claim 35, wherein said processed product comprises clothing.

39. A method according to claim 35, wherein the basic colors include at least one of cyan, magenta and yellow colors.

40. A method according to claim 35, wherein the special color comprises at least one color of red, blue and green colors.

41. A printing apparatus for printing an image, said apparatus comprising:

printing means for forming an image on a printing medium with colorants based on data of an image to be printed; and control means for controlling driving of the printing means to form the image by using a plurality of colorants of a plurality of basic colors, at least one of which has different colorant concentrations, and a special colorant other than colorants of the basic colors, which has a single colorant concentration and is of a color between basic colors of the plurality of basic colors in a color space, wherein a relatively low density portion of the image of at least the special color is formed, instead of using the special color colorant, by mixing the plurality of the basic color colorants, at least one of the plurality of basic color colorants having a colorant concentration relatively lower than a colorant concentration of other basic color inks of the same color, and a portion of the image of at least the special color and having a density relatively higher than that of the low density portion of the image is formed using the special color colorant.

42. A printing apparatus according to claim 41, wherein the basic colors include at least one of cyan, magenta and yellow colors.

43. A printing apparatus according to claim 41, wherein the special color comprises at least one color of red, blue and green colors.

44. A method of forming a printed product comprising the steps of:

providing a printing medium; and printing a plurality of colorant dots on said printing medium to form an image area, wherein the plurality of colorant dots printed in said printing step include colorant dots of a plurality of basic colors and special colorant dots of a special color other than the basic colors, dots of at least one color of the plurality of basic colors include colorant dots having different optical densities, wherein a relatively low density portion of the image area of at least the special color includes, instead of dots of the special color, mixed dots of the plurality of the basic colors, and a portion of the image of at least the special color and having a density relatively higher than that of the low density portion of the image includes dots of the special color.

45. A method according to claim 44, wherein the mixed dots include dots of at least one of the basic colors that has an optical density lower than that of other colorant dots of the same basic color.

46. A method according to claim 44, wherein the relatively low density portion of the image area is visually perceived as the special color.

47. A method according to claim 44, wherein the basic colors include at least one of cyan, magenta and yellow colors.

48. A method according to claim 44, wherein the special color comprises at least one color of red, blue and green colors.

49. A printing method of printing with printing means for forming an image on a printing medium with ink on the basis of data of an image to be printed, said method comprising the steps of:

providing the printing means; and forming an image area which is depicted by a plurality of colorant dots on the printing medium using the printing means, wherein the plurality of colorant dots include colorant dots of a plurality of basic colors and special colorant dots of a special color other than the basic colors, dots of at least one color of the basic colors including colorant dots having different optical densities, and wherein a relatively low density portion of the image area of at least the special color includes, instead of dots of the special color, mixed dots of the plurality of the basic colors, and a portion of the image of at least the special color and having a density relatively higher than that of the low density portion of the image includes dots of the special color.

50. A printing method according to claim 49, wherein the basic colors include at least one of cyan, magenta and yellow colors.

51. A printing method according to claim 49, wherein the special color comprises at least one color of red, blue and green colors.

* * * * *

UNITED STATES PATENT AND TRADEMARK OFFICE
CERTIFICATE OF CORRECTION

PATENT NO. : 5,988,791

DATED : November 23, 1999

INVENTOR(S) : MIYASHITA ET AL.

It is certified that error appears in the above-identified patent and that said Letters Patent is hereby corrected as shown below:

On the title page, item
[56] References Cited:
  U.S. PATENT DOCUMENTS,
--5,461,482   10/1995   Wilson et al. . . . . . . . . . 347/50"
should be inserted.
  FOREIGN PATENT DOCUMENTS, "3046589" should read
--3-046589-- and "4018358" should read --4-018358--.

IN THE DRAWINGS:
  Sheet 8 of 21, Figure 8, between blocks 642 and 637,
"S1(3)" and "S2(3)" should read --S1(1)-- and --S2(1)--,
respectively.

IN THE ABSTRACT:
  Line 1, "printing apparatus printing apparatus" should read
--printing apparatus--.

COLUMN 3:
  Line 39, "explaining" should read --explaining the--.

COLUMN 5:
  Line 25, "11B," should read --11b,--.
  Line 42, "14d," (first occurrence) should read --14c,--.

COLUMN 6:
  Line 54, "heads" should read --head--.

COLUMN 8:
  Line 37, "a" (second occurrence) should read --an--.

UNITED STATES PATENT AND TRADEMARK OFFICE
CERTIFICATE OF CORRECTION

PATENT NO. : 5,988,791

DATED : November 23, 1999

INVENTOR(S) : MIYASHITA ET AL.

It is certified that error appears in the above-identified patent and that said Letters Patent is hereby corrected as shown below:

COLUMN 9:
  Line 41, "Steps" should read --Step--.

COLUMN 11:
  Line 21, "P" should read --$\beta$--.
  Line 22, "a" (first occurrence) should read --$\alpha$--.
  Line 60, "S1(1)" (second occurrence) should read --S2(1)--.
  Line 61, "K(4), K(4)," should read --K(4),--.

COLUMN 14:
  Line 1, "of" should read --of the--.
  Line 63, "calorimetric" should read --colorimetric--.

COLUMN 15:
  Line 47, "Reconversion" should read --$\gamma$-conversion--.

COLUMN 16:
  Line 39, "BLB=BL(1)-BL1(1))" should read
--BLB=BL(1)-BL'(1))--.

COLUMN 18:
  Line 67, "of" should read --of the--.

COLUMN 21:
  Line 3, "Reactive dye (C.I. Reactive Yellow 95) should be moved to the first item in the table immediately below.

UNITED STATES PATENT AND TRADEMARK OFFICE
CERTIFICATE OF CORRECTION

PATENT NO. : 5,988,791

DATED : November 23, 1999

INVENTOR(S) : MIYASHITA ET AL.

It is certified that error appears in the above-identified patent and that said Letters Patent is hereby corrected as shown below:

COLUMN 21:
  Line 14, "Reactive dye (C.I. Reactive Red 24) should be moved to the first item in the table immediately below.
  Line 24, "Reactive dye (C.I. Reactive Blue 72) should be moved to the first item in the table immediately below.
  Line 32, "Reactive dye (C.I. Reactive Blue 49) should be moved to the first item in the table immediately below.
  Line 40, "Reactive dye (C.I. Reactive Black 39) should be moved to the first item in the table immediately below.

Signed and Sealed this

Twenty-seventh Day of March, 2001

Attest:

NICHOLAS P. GODICI

Attesting Officer        Acting Director of the United States Patent and Trademark Office